US007941161B2

(12) United States Patent
Ioppe et al.

(10) Patent No.: US 7,941,161 B2
(45) Date of Patent: *May 10, 2011

(54) SYSTEM FOR PROVIDING ALERT-BASED SERVICES TO MOBILE STATIONS IN A WIRELESS COMMUNICATIONS NETWORK

(75) Inventors: Igor V. Ioppe, San Francisco, CA (US); Tasso Roumeliotis, Orinda, CA (US); Scott Allen Hotes, Berkeley, CA (US); Philip Nathan Klein, Providence, RI (US); Joel A. Susal, Palo Alto, CA (US)

(73) Assignee: WaveMarket, Inc., Emeryville, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/633,051

(22) Filed: Dec. 8, 2009

(65) Prior Publication Data
US 2010/0105414 A1 Apr. 29, 2010

Related U.S. Application Data

(62) Division of application No. 10/483,778, filed as application No. PCT/CA02/01080 on Jul. 16, 2002, now Pat. No. 7,643,834.

(60) Provisional application No. 60/305,580, filed on Jul. 16, 2001, provisional application No. 60/359,793, filed on Feb. 26, 2002, provisional application No. 60/359,792, filed on Feb. 26, 2002, provisional application No. 60/360,527, filed on Feb. 28, 2002.

(51) Int. Cl.
*H04W 24/00* (2009.01)

(52) U.S. Cl. ............. 455/456.3; 455/456.1; 455/404.2; 455/414.3; 340/539.13; 340/7.38; 340/7.58

(58) Field of Classification Search ............ 455/404.2, 455/456.1–457, 458, 466; 340/539.13
See application file for complete search history.

(56) References Cited

U.S. PATENT DOCUMENTS

| 5,223,844 A | 6/1993 | Mansell et al. |
| 5,278,539 A | 1/1994 | Lauterbach et al. |

(Continued)

FOREIGN PATENT DOCUMENTS

EP 0781067 6/1997

(Continued)

*Primary Examiner* — Sharad Rampuria
(74) *Attorney, Agent, or Firm* — Dovas Law, P.C.

(57) ABSTRACT

System for providing alert-based communication services for which corresponding alert conditions to be met by mobile stations are defined. The system includes an alert engine capable of firing alerts associated with the alert-based communication services if location data regarding the mobile stations is indicative of the mobile stations meeting the alert conditions corresponding to the alert-based communication services. A requirements engine is provided for determining an expected earliest future time at which at least one alert condition is capable of being met by a particular mobile station and outputting a data element indicative of a requirement to obtain updated location data about the particular mobile station in advance of the expected earliest future time. Also provided is a scheduler for receiving expiry times data indicative of a plurality of expiry times relating to respective location requests, processing the expiry times data for determining an order for servicing the location requests by positioning determining equipment (PDE) at least in part on a basis on the expiry times of the location requests and an output for interfacing with the PDE, allowing it to service the location requests according to the order determined.

53 Claims, 10 Drawing Sheets

U.S. PATENT DOCUMENTS

| | | | |
|---|---|---|---|
| 5,628,050 A | 5/1997 | McGraw et al. | |
| 5,724,243 A | 3/1998 | Westerlage et al. | |
| 5,732,383 A | 3/1998 | Foladare et al. | |
| 5,815,802 A | 9/1998 | Loechner, II | |
| 5,907,293 A | 5/1999 | Tognazzini | |
| 5,948,040 A | 9/1999 | Delorme et al. | |
| 5,959,577 A | 9/1999 | Fan et al. | |
| 5,959,945 A | 9/1999 | Kleiman | |
| 6,031,455 A | 2/2000 | Grube et al. | |
| 6,052,598 A | 4/2000 | Agrawal et al. | |
| 6,091,956 A | 7/2000 | Hollenberg | |
| 6,115,611 A | 9/2000 | Kimoto et al. | |
| 6,134,454 A * | 10/2000 | Foladare et al. | 455/556.2 |
| 6,236,933 B1 | 5/2001 | Lang | |
| 6,256,577 B1 | 7/2001 | Graunke | |
| 6,278,375 B1 | 8/2001 | Hucker | |
| 6,351,221 B1 | 2/2002 | Phillips et al. | |
| 6,381,465 B1 | 4/2002 | Chern et al. | |
| 6,400,956 B1 | 6/2002 | Richton | |
| 6,519,465 B2 | 2/2003 | Stilp et al. | |
| 6,615,130 B2 | 9/2003 | Myr | |
| 6,631,267 B1 | 10/2003 | Clarkson et al. | |
| 6,647,257 B2 | 11/2003 | Owensby | |
| 6,647,269 B2 | 11/2003 | Hendrey et al. | |
| 6,731,238 B2 * | 5/2004 | Johnson | 342/357.48 |
| 6,731,940 B1 | 5/2004 | Nagendran | |
| 6,745,021 B1 | 6/2004 | Stevens | |
| 6,772,213 B2 | 8/2004 | Glorikian | |
| 6,795,710 B1 | 9/2004 | Creemer | |
| 6,834,195 B2 | 12/2004 | Brandenberg et al. | |
| 6,914,525 B2 | 7/2005 | Rao et al. | |
| 6,941,126 B1 | 9/2005 | Jordan, Jr. | |
| 7,039,387 B2 * | 5/2006 | Macolly et al. | 455/404.1 |
| 7,054,612 B2 * | 5/2006 | Patel | 455/404.1 |
| 7,123,926 B2 | 10/2006 | Himmelstein | |
| 7,184,744 B1 * | 2/2007 | Schnabel | 455/404.2 |
| 7,194,249 B2 * | 3/2007 | Phillips et al. | 455/404.1 |
| 7,202,814 B2 | 4/2007 | Caspi et al. | |
| 7,260,378 B2 | 8/2007 | Holland et al. | |
| 7,301,450 B2 * | 11/2007 | Carrino | 340/539.11 |
| 7,525,484 B2 | 4/2009 | Dupray et al. | |
| 7,764,946 B1 * | 7/2010 | Sennett et al. | 455/404.1 |
| 2001/0022558 A1 | 9/2001 | Karr, Jr. et al. | |
| 2001/0029425 A1 | 10/2001 | Myr | |
| 2001/0044310 A1 | 11/2001 | Lincke | |
| 2006/0079245 A1 | 4/2006 | Moed | |
| 2006/0089136 A1 | 4/2006 | Rajkotia | |
| 2006/0111089 A1 | 5/2006 | Winter et al. | |
| 2006/0223494 A1 * | 10/2006 | Chmaytelli et al. | 455/404.2 |
| 2007/0072583 A1 * | 3/2007 | Barbeau et al. | 455/404.2 |
| 2007/0149214 A1 * | 6/2007 | Walsh et al. | 455/456.1 |
| 2007/0270132 A1 | 11/2007 | Poosala | |
| 2007/0293240 A1 * | 12/2007 | Drennan | 455/456.1 |
| 2008/0169920 A1 * | 7/2008 | Spence | 340/539.1 |
| 2008/0242373 A1 | 10/2008 | Lu et al. | |
| 2009/0156161 A1 * | 6/2009 | Strahs | 455/404.2 |
| 2011/0034183 A1 * | 2/2011 | Haag et al. | 455/456.3 |

FOREIGN PATENT DOCUMENTS

| | | |
|---|---|---|
| EP | 1081974 | 3/2001 |
| JP | 11346380 | 12/1999 |

* cited by examiner

SYSTEM FOR PROVIDING ALERT-BASED SERVICES TO MOBILE STATIONS IN A WIRELESS COMMUNICATIONS NETWORK

CROSS-REFERENCES TO RELATED APPLICATIONS

This application is a division of U.S. patent application Ser. No. 10/483,778, which is the National Stage of International Application No. PCT/CA02/01080, filed Jul. 16, 2002, which claims the benefit of the following provisional applications:
Ser. No. 60/305,580 to Hotes et al., filed on Jul. 16, 2001;
Ser. No. 60/359,793 to Hotes et al., filed Feb. 26, 2002;
Ser. No. 60/359,792 to Hotes et al., filed Feb. 26, 2002; and
Ser. No. 60/360,527 to Klein et al., filed Feb. 28, 2002;
which U.S. patent application Ser. No. 10/483,778, International Application No. PCT/CA02/01080 and above-indicated provisional applications are incorporated by reference as if fully set forth.

FIELD OF THE INVENTION

The present invention relates generally to communications networks and, more particularly, to a system for providing alert-based services to mobile stations in a wireless communication network.

BACKGROUND OF THE INVENTION

In the current age of significant telecommunications competition, mobile network operators continuously seek new and innovative ways to create differentiation and increase profits. One of the best ways to accomplish this goal is through the delivery of highly personalized services, such as location-based services (LBS). Moreover, mobile network operators are required under the laws of certain national governments to equip their infrastructure with the ability to provide LBS, particularly having regard to emergency services. In all, there are at least four major categories of LBS, namely location-based information, location-sensitive billing, emergency services and tracking.

A popular feature of LBS is the capability to support alert-based services (ABS). In an alert-based application, registered mobile stations within the wireless network are monitored, and alerts are triggered for each mobile station based on the location of the mobile station. When an alert fires for a particular mobile station reaching or entering a predetermined location, at least one specific action is taken, such as the transmission of a message to the particular mobile station or the updating of a database. The appeal of ABS is wide-ranging, from commercial to government sectors, for the purposes of marketing, advertising, law enforcement, emergency monitoring and communication-based services, among others.

As the adoption rates of wireless LBS grow, network operators and other mobile location data providers will be required to provide an increasing amount of mobile location data to a variety of alert-based applications. These alert-based applications vary widely in their location data requirements. More specifically, some applications, such as a driving directions application or a merchant finder application, require timely data, initiated by the mobile station user. Other types of applications performing some kind of user tracking may require data only sporadically, with the delay between location requests varying as a function of mobile station position.

One of the most obvious and important aspects of ABS is positioning, i.e., the ability to determine the position of a mobile station in the network. One example of a widely recognized positioning technology is the Global Positioning System (GPS). In addition to GPS, other positioning techniques typically rely on various means of triangulation of the signal from cell sites serving a mobile station. In addition, the serving cell site can be used as a fix for location of the user.

Geographic data is another important aspect of any location system. Geographic Information Systems (GIS) provide the tools to provision and administer base map data such as man-made structures (streets, buildings) and terrain (mountains, rivers). GIS is also used to manage point-of-interest data such as location of gas stations, restaurants, nightclubs, etc. Finally, GIS information also includes information about the radio frequency characteristics of the mobile network. This allows the system to determine the serving cell site of the user.

Finally, it is not enough to be able to position the mobile user and know the map data around that position. There must also be provided a location management function to process positioning and GIS data on behalf of ABS applications. The location management function is middleware that acts as a gateway and mediator between positioning equipment and the LBS/ABS infrastructure. Among other things, the location management function may be employed to convert positioning information into useful location information and make it available for various ABS applications.

In conventional wireless networks, a request/answer mechanism involving the location management function and one or more network entities is used to determine position information regarding a mobile station in the network. Network entities that can receive location requests and thus may be involved in the request/answer mechanism include base station controllers (BSC), mobile switching centers (MSC), home location registers (HLR), visited location registers (VLR), gateway mobile location centers (GMLC), serving mobile location centers (SMLC), mobile positioning centers (MPC) and positioning determining entities (PDE), among other possibilities. The request/answer mechanism is typically implemented by leveraging the signaling that is supported by both of today's prevailing wireless network protocols, namely American National Standards Institute (ANSI)-41 and Global System for Mobility (GSM). Although the prevailing SS7 signaling is able to support this request/answer mechanism, other transport mechanisms may also be used for this purpose.

For example, the Wireless Intelligent Network (WIN) standard—also known as IS-848 and based on the ANSI-41 protocol—provides for the position of a mobile station to be obtained in the following manner. The location management function at a given service control point interrogates an HLR using a specific position request (PosReq) message. The HLR knows the last VLR that served the mobile user. Accordingly, the HLR launches a request to this VLR for position information (such as a cell site identifier) and, upon receiving this information, sends it back to the service control point in a PosReq response message.

As can be appreciated, conventional techniques require that the network be capable of specifically addressing each location request soon after it is generated. Moreover, in order for most ABS applications to be of any value, it will be necessary to request user location information at intervals of minutes or less. It is therefore apparent that the network will become increasingly, if not overly, congested as it attempts to satisfy frequent requests on behalf of each ABS application, for each user of interest. As a result, the switching and transport capacity of a wireless network will be eroded by the burdensome requirements of obtaining location information in a conventional manner.

Against this background, there is clearly a need to enable ABS applications by obtaining and using valuable location information without surpassing available bandwidth and load limits within the wireless communications network.

SUMMARY OF THE INVENTION

According to a first broad aspect, the present invention provides computer-readable media tangibly embodying a program of instructions executable by a computing device to implement a method, the computing device being capable of interfacing with a communications network adapted to provide alert-based services for which corresponding alert conditions to be met by mobile stations are defined, the method comprising: determining an expected earliest future time at which at least one alert condition is capable of being met by a particular mobile station; and outputting a data element indicative of a requirement to obtain updated location data about the particular mobile station in advance of the expected earliest future time.

According to a second broad aspect, the present invention provides a method for use in a communications network adapted to provide alert-based services defined for a plurality of mobile stations and a variety of alert conditions, comprising: determining an expected earliest future time at which at least one alert condition is capable of being met by a particular mobile station; and outputting a data element indicative of a requirement to obtain updated location data about the particular mobile station in advance of the expected earliest future time.

According to a third broad aspect, the present invention provides a system for use in a communications network adapted to provide alert-based services defined for a plurality of mobile stations and a variety of alert conditions, comprising: means for determining an expected earliest future time at which at least one alert condition is capable of being met by a particular mobile station; and means for outputting a data element indicative of a requirement to obtain updated location data about the particular mobile station in advance of the expected earliest future time.

According to a fourth broad aspect, the present invention provides a computer readable storage medium containing a program element for execution by a computing device to implement a method in a communications network adapted to provide alert-based services defined for a plurality of mobile stations and a variety of alert conditions, the program element including: program code means for determining an expected earliest future time at which at least one alert condition is capable of being met by a particular mobile station; and program code means for outputting a data element indicative of a requirement to obtain updated location data about the particular mobile station in advance of the expected earliest future time.

According to a fifth broad aspect, the present invention provides a data processing device for use in a communications network adapted to provide alert-based services for which corresponding alert conditions to be met by mobile stations are defined, comprising: an input capable of receiving updated location data about the mobile stations; and a processing unit connected to the input, the processing unit being capable of: determining, on the basis of the updated location data about a particular mobile station, for which alert-based services, if any, at least one corresponding alert condition is met by the particular mobile station; and generating a trigger to fire of an alert associated with each alert-based service for which at least one corresponding alert condition has been met by the mobile station.

According to a sixth broad aspect, the present invention provides a method for use in a communications network adapted to provide alert-based services for which corresponding alert conditions to be met by mobile stations are defined, comprising: receiving updated location data about the mobile stations; determining, on the basis of the updated location data about a particular mobile station, for which alert-based services, if any, at least one corresponding alert condition is met by the particular mobile station; and generating a trigger to fire an alert associated with each alert-based service for which at least one corresponding alert condition has been met by the mobile station.

According to a seventh broad aspect, the present invention provides a system for use in a communications network adapted to provide alert-based services for which corresponding alert conditions to be met by mobile stations are defined, comprising: means for receiving updated location data about the mobile stations; means for determining, on the basis of the updated location data about a particular mobile station, for which alert-based services, if any, at least one corresponding alert condition is met by the particular mobile station; and means for generating a trigger to fire an alert associated with each alert-based service for which at least one corresponding alert condition has been met by the mobile station.

According to an eighth broad aspect, the present invention provides computer-readable media tangibly embodying a program of instructions executable by a computing device to implement a method in a communications network adapted to provide alert-based services for which corresponding alert conditions to be met by mobile stations are defined, the method comprising: receiving updated location data about the mobile stations; determining, on the basis of the updated location data about a particular mobile station, for which alert-based services, if any, at least one corresponding alert condition is met by the particular mobile station; and generating a trigger to fire an alert associated with each alert-based service for which at least one corresponding alert condition has been met by the mobile station.

According to a ninth broad aspect, the present invention provides a system for providing alert-based communication services for which corresponding alert conditions to be met by mobile stations are defined, comprising: an alert engine capable of firing alerts associated with the alert-based communication services if location data regarding the mobile stations is indicative of the mobile stations meeting the alert conditions corresponding to the alert-based communication services.

According to a tenth broad aspect, the present invention provides a method of accessing a data structure for obtaining an earliest expected travel time between a current location and a plurality of alert regions, the data structure containing data regarding a subdivision of a network into cells for which a respective alert region is the nearest to all points in the cell, the method comprising: using a point-location data structure to determine which cell contains the current location; using the table to determine the alert region associated with the cell found in step (a); and using a cost function to determine the travel time from the current location to the alert region found in step (b).

According to an eleventh broad aspect, the present invention provides an apparatus for scheduling servicing of location requests by a PDE, comprising: an input for receiving expiry times data indicative of a plurality of expiry times relating to respective location requests; a scheduler processing the expiry times data for determining an order for servicing the location requests by the PDE at least in part on a basis on the expiry times of the location requests; an output for interfacing with the PDE allowing the PDE to service the location requests according to the order determined by the scheduler.

According to a twelfth broad aspect, the present invention provides a computer readable storage medium including a program element for execution by a processor to implement an apparatus for scheduling servicing of location requests by a PDE, comprising: a scheduling module for accepting as input expiry times data indicative of a plurality of expiry times relating to respective location requests for computing an order for servicing the location requests by the PDE at least in part on a basis on the expiry times of the location requests; an output module for interfacing with the PDE allowing the PDE to service the location requests according to the order determined by the scheduler.

According to a thirteenth broad aspect, the present invention provides a method for scheduling servicing of location requests by a PDE, comprising: receiving expiry times data indicative of a plurality of expiry times relating to respective location requests; processing the expiry times data for determining an order for servicing the location requests by the position determination equipment at least in part on a basis on the expiry times of the location requests; interfacing with the PDE for allowing the PDE to service the location requests according to the determining.

According to a fourteenth broad aspect, the present invention provides an apparatus for scheduling servicing of location requests by a PDE, comprising: an input for receiving data elements from an entity, the data elements indicative of respective location requests; the location requests including delayed-type location requests, a location request data element associated with a delayed-type location request including expiry time data; a scheduler for determining when location requests are to be serviced, the determining being such that the servicing of at least some delayed-type location requests is postponed artificially; an output for interfacing with the PDE allowing the PDE to service the location requests according to the determining.

According to a fifteenth broad aspect, the present invention provides a method for scheduling servicing of location requests by a PDE, comprising: receiving data elements from an entity, the data elements indicative of respective location requests, the location requests including delayed-type location requests, a location request data element associated with a delayed-type location request including expiry time data; determining when location requests are to be serviced, the determining being such that the servicing of at least some delayed-type location requests is postponed artificially; interfacing with the PDE allowing the PDE to service the location requests according to the determining.

According to a sixteenth broad aspect, the present invention provides a computer readable storage medium including a program element for execution by a processor to implement an apparatus for scheduling servicing of location requests by a PDE, comprising: a scheduling module for accepting as input data elements from an entity, the data elements indicative of respective location requests, the location requests including delayed-type location requests, a location request data element associated with a delayed-type location request including expiry time data, the scheduling module being operative for determining when location requests are to be serviced, the determining being such that the servicing of at least some delayed-type location requests is postponed artificially; an output module for interfacing with the PDE allowing the PDE to service the location requests according to the determining.

According to a seventeenth broad aspect, the present invention provides an apparatus for scheduling servicing of location requests by a PDE, comprising: an input for receiving a plurality of data elements from an entity, the plurality data elements indicative of respective location requests; the location requests including delayed-type location requests, a location request data element associated with a delayed-type location request including expiry time data; a scheduler for: identifying among the delayed-type location requests, two or more delayed-type location requests that can be serviced by a common location query to the PDE: determining at least in part on the basis of the respective expiry times of the delayed-type location requests identified at (i) when to issue the common location query to the PDE; an output for issuing the common location query.

According to an eighteenth broad aspect, the present invention provides a method for scheduling servicing of location requests by a PDE, comprising: receiving a plurality of data elements from an entity, the plurality data elements indicative of respective location requests, the location requests including delayed-type location requests, a location request data element associated with a delayed-type location request including expiry time data; identifying among the delayed-type location requests, two or more delayed-type location requests that can be serviced by a common location query to the PDE: determining at least in part on the basis of the respective expiry times of the delayed-type location requests identified at (ii) when to issue the common location query to the PDE; issuing the common location query.

According to a nineteenth broad aspect, the present invention provides a computer readable storage medium including a program element for execution by a processor to implement an apparatus for scheduling servicing of location requests by a PDE, comprising: a scheduling module for accepting a plurality of data elements from an entity, the plurality data elements indicative of respective location requests, the location requests including delayed-type location requests, a location request data element associated with a delayed-type location request including expiry time data, the scheduling module being operative for: identifying among the delayed-type location requests, two or more delayed-type location requests that can be serviced by a common location query to the PDE: determining at least in part on the basis of the respective expiry times of the delayed-type location requests identified at (i) when to issue the common location query to the PDE; an output module for issuing the common location query.

According to a twentieth broad aspect, the present invention provides an apparatus for scheduling servicing of location requests by a PDE, comprising: Input means for receiving expiry times data indicative of a plurality of expiry times relating to respective location requests; Scheduler means for processing the expiry times data for determining an order for servicing the location requests by the PDE at least in part on a basis on the expiry times of the location requests; output means for interfacing with the PDE allowing the PDE to service the location requests according to the order determined by the scheduler.

According to a twenty-first broad aspect, the present invention provides an apparatus for scheduling servicing of location requests by a PDE, comprising: input means for receiving data elements from an entity, the data elements indicative of respective location requests, the location requests including delayed-type location requests, a location request data element associated with a delayed-type location request including expiry time data; scheduling means for determining when location requests are to be serviced, the determining being such that the servicing of at least some delayed-type location requests is postponed artificially; output means for interfacing with the PDE allowing the PDE to service the location requests according to the determining.

According to a twenty-second broad aspect, the present invention provides an apparatus for scheduling servicing of location requests by a PDE, comprising: input means for receiving a plurality of data elements from an entity, the plurality data elements indicative of respective location requests, the location requests including delayed-type location requests, a location request data element associated with a delayed-type location request including expiry time data; scheduling means for: identifying among the delayed-type location requests, two or more delayed-type location requests that can be serviced by a common location query to the PDE: determining at least in part on the basis of the respective expiry times of the delayed-type location requests identified at (i) when to issue the common location query to the PDE; and output means for issuing the common location query.

According to a twenty-third broad aspect, the present invention provides a memory for storing data for access by an application program being executed on a data processing device used in a communications network adapted to provide alert-based services for which corresponding alert conditions to be met by mobile stations are defined, comprising: a secondary memory for holding a plurality of data structures, the data structures being associated with respective non-overlapping time intervals, each of the data structures containing information relevant to a respective category of alert conditions that requires a current time to be included in the time interval associated with that data structure; a primary memory for storing the one data structure associated with the time interval that includes the current time.

According to a twenty-fourth broad aspect, the present invention provides a method of creating a data structure for access by an application program being executed on a data processing device used in a communications network adapted to provide alert-based services for which corresponding alert conditions to be met by mobile stations are defined, each alert condition corresponding to an alert region, comprising: defining a subdivision of the network into nodes; computing, for each node, the nearest alert region; merging together into a single cell for each alert region, those nodes having that alert region as the nearest alert region; maintaining a data structure that is indicative of the locations covered by each cell and the alert condition associated with that cell.

According to a twenty-fifth broad aspect, the present invention provides a method of delivering an alert-based communications service relevant to a mobile station in a communications network, wherein the alert-based communications service is associated with an alert condition to be satisfied by the mobile station, comprising: obtaining location data about the mobile station for a first time instant; predicting location data about the mobile station for a second time instant after the first time instant based on the location data about mobile station for the first time instant; if the mobile station is predicted to be within the alert region at the second time instant, triggering the firing of an alert at or after the second time instant.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Embodiments of the present invention allow the efficient implementation of alert-based communication services in a communications network. Such services provide for the execution of certain well-defined actions when the mobile station satisfies a set of alert-triggering conditions. It is common parlance in the field of alert-based services to say that satisfying the set of conditions triggers "firing" of an "alert".

A non-limiting example of an alert-based communication service is the delivery of information about a particular restaurant to a mobile station when the latter is on the same street as the particular restaurant. Another non-limiting example of an alert-based communication service is the transmittal of information to a home telephone when a mobile station reaches a certain distance from the home. In yet another non-limiting example of an alert-based communication service, when a speed measurement inferred from past and present location data about a mobile station shows that the speed of the mobile station exceeds a threshold, an alarm may be signaled to highway patrol authorities. It should be understood that "alert-based services" refers broadly to any service where some signal is "pushed" to an entity when certain conditions related to mobile station location are met, whether directly related to instantaneous mobile station location or as a result of a change in mobile station location with time. Such services may in some cases be provided without the consent or even knowledge of the mobile station whose location influences the triggering of an alert.

It has been realized that many useful alert-based communication services, including the specific non-limiting examples mentioned herein above, can still be provided even if the mobile station is not constantly tracked. Specifically, there are cases where the receipt of multiple location updates in close succession do not result in improved delivery of the alert-based service. In actual fact, as long as location updates are received in such a way that the alert triggering conditions corresponding to that alert-based service are guaranteed not to be missed when they are met, there is no need to request additional location updates in the interim. This optimized way of requesting updated location data results in less frequent issuance of location update requests (which therefore consumes less network bandwidth resources) and less frequent processing of updated location data (which therefore consumes less network computation resources).

Figure 1:
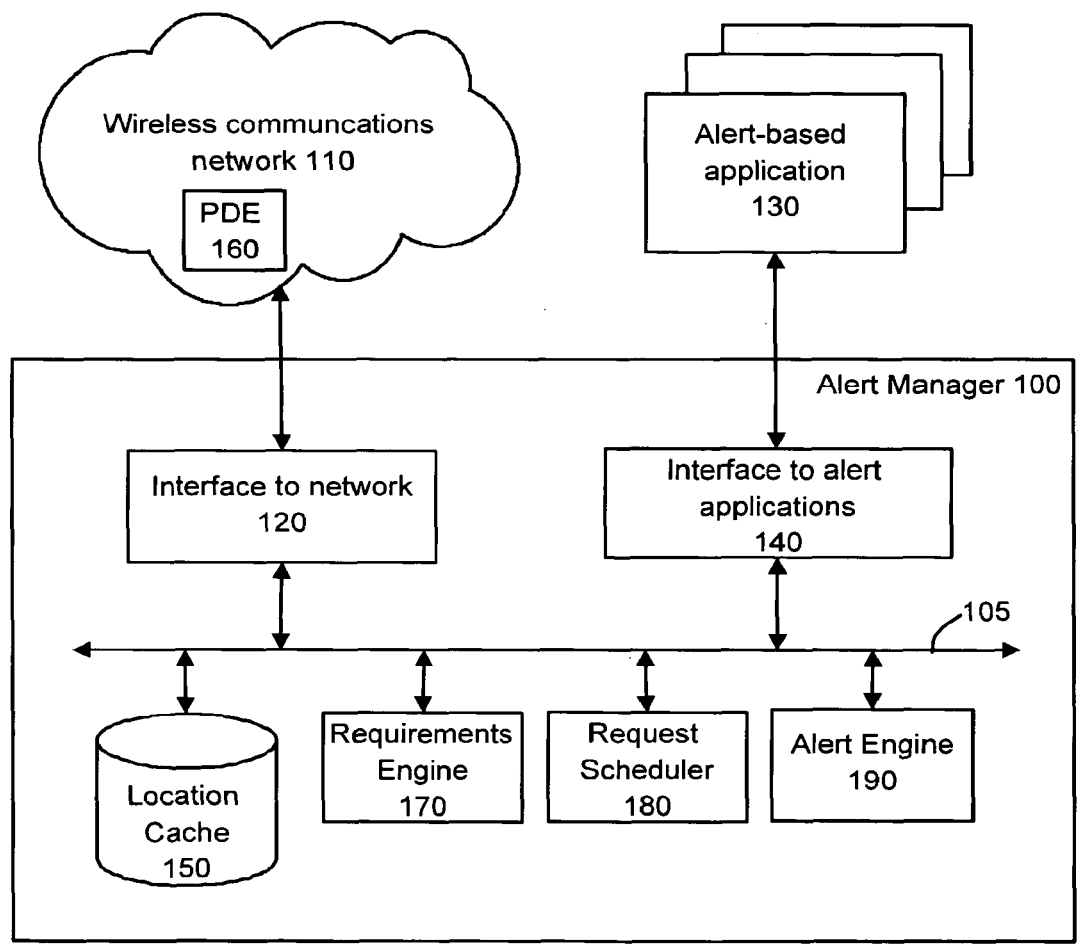
FIG. 1 shows, in block diagram form, an alert manager for use in a wireless communications network, in accordance with an embodiment of the present invention.

With reference to FIG. 1, there is shown an alert manager 100 for use in a wireless communications network 110. The alert manager 100 may be implemented on a computer server, for example. The alert manager 100 has a first interface 120 to the network 110. The interface 120 is used to transmit requests for updated location data to individual mobile stations in the network 110 and to receive location data about individual mobile stations. The alert manager 100 is also in communication with one or more alert-based applications 130 via a second interface 140. The second interface 140 is used to receive alert-triggering conditions and mobile station identification from the alert-based applications 130 and to transmit information to each alert-based application 130 that is indicative of when the alert-triggering conditions corresponding to the alert-based service have been met by a particular mobile station in the network 110.

The alert manager 100 includes a location cache 150, which stores location data about mobile stations in the network 110 as received from a position determination entity (PDE) 160 in the network 110 via the first interface 120. Note that by "position determination entity" is implied any type of entity in the network 110 that is capable of receiving location requests and determining the location of a mobile station in the network 110. Examples of such PDEs include base station controllers (BSC), mobile switching centers (MSC), home location registers (HLR), visited location registers (VLR), gateway mobile location centers (GMLC), short message location centers (SMLC) and mobile positioning centers (MPC), as well as the well known ANSI-41 PDE, among other possibilities.

The location cache 150 includes a plurality of data elements, each data element being associated with the identity of a mobile station, the location of the mobile station and the time at which the location was determined by the PDE 169. The "time at which the location was determined" can refer to a time reference that is shared by all entities in the alert manager 100 as well as the PDE 160. It is noted that the PDE 160 includes either or both of active or synchronous PDE (responsive to a request for updated location data) and a passive or asynchronous PDE (which provides updated location data without having requested it). A suitable example of a passive position determination entity 160 is described in U.S. Provisional Patent Application Ser. No. 60/303,020 to Viswanath et al., filed on Jul. 5, 2001 and in a co-pending PCT Application to Ioppe et al., filed on Jul. 5, 2002 and designating the United States of America, both of which are hereby incorporated by reference herein.

The alert manager 100 also includes a requirements engine 170, a request scheduler 180, and an alert engine 190. In some embodiments, these three functional modules 170, 180, 190 may be hardware components interconnected by a bus 105, while in other embodiments, they may be made up of individual interrelated software components sharing the same processing unit. Various other physical implementations of the functional modules that are the requirements engine 170, request scheduler 180 and alert engine 190 are within the scope of the present invention.

The requirements engine 170 interfaces with the location cache 150 to obtain knowledge of when a location update has arrived for a particular mobile station. The requirements engine 170 also interfaces with the alert-based application 130 via the second interface 140 in order to obtain information regarding the alert-triggering conditions corresponding to the alert-based service for individual mobile stations. The requirements engine 170 outputs a message to the request scheduler 180, such message containing a data element indicative of a deadline by which updated location data about a particular mobile station is required.

The request scheduler 180 is adapted to receive the message output by the requirements engine 170. The request scheduler interfaces with the network via the first interface in order to determine when location requests will be scheduled. The request scheduler 180 is implanted in software executed on a suitable computing platform. It should be appreciated that alternative implementations, such as in hardware or a combination of software and hardware are possible without departing from the spirit of the invention.

Based on a data element in the message received from the requirements engine 170 which identifies a particular mobile station and a deadline, the role of the request scheduler 180 is to ensure that updated location data about the particular mobile station is written to the location cache 150 before the deadline.

The alert engine 190 interfaces with the location cache 150 to obtain knowledge about when updated location data is received for a particular mobile station. The alert engine 190 also interfaces with the alert-based applications 130 in order to obtain the alert-triggering criteria corresponding to the alert-based services relevant to the particular mobile station. Based upon the information obtained from the location cache 150, the alert engine 190 determines whether the particular mobile station meets the alert-triggering conditions corresponding to an alert-based service and, if so, sends a trigger to the alert-based application 130 indicating that it should fire an alert. Furthermore, the alert engine 190 may be connected (e.g., via the bus 105) to the requirements engine 170 in order to receive information therefrom regarding a minimum alert triggering time, which is described in further detail later on.

Each of the functional modules 170, 180, 190 of the alert manager 100 will now be described in greater detail, starting with the requirements engine 170, which participates in minimizing the frequency with which location updates are requested in the network 110. This goal is achieved by allowing an acceptable delay for receiving updated location data about a particular mobile station. However, the delay must be carefully chosen in order to guarantee that the alert-triggering conditions corresponding to the alert-based services are not missed. Therefore, with regard to a particular mobile station and a particular alert-triggering condition, the circuitry, software and/or control logic in the requirements engine 170 determines an expected earliest future time at which the alert-triggering condition is capable of being met by the particular mobile station. This may be referred to as the minimum alert trigger time (MATT) for the particular mobile station and the particular alert-triggering condition.

Once computed, the MATT is formulated into a requirement that updated location data about the particular mobile station be received prior to that time and such requirement is supplied as a data element in a message transmitted to the request scheduler 180. The time instant determined in this fashion represents an "educated guess" by the requirements engine 170 that the mobile station will not meet the particular alert-triggering condition prior to the MATT and therefore updated location data received at any time in the interim will be of equal value to successfully delivering the corresponding alert-based service. However, as will be described herein below, later-received location data may often be of greater use than earlier-received information. The MATT can also be referred to as a "deadline" or an expiry time for receipt of updated location data.

Two factors that enter into the design of the requirements engine 170 are the timing of the MATT computation and the methodology used to compute travel time. Regarding timing, in a specific embodiment of the present invention, each time updated location data about a particular mobile station is written to the location cache 150, the MATT is determined for the particular mobile station and each applicable alert-triggering condition. It should be appreciated that the computational task of determining a MATT may be performed as a background process so as not to overload the processor that runs the requirements engine 170. This may afford considerable savings in the case where the requirements engine 170 shares the same processing unit as the request scheduler 180 and/or the alert engine 190.

Figure 2:
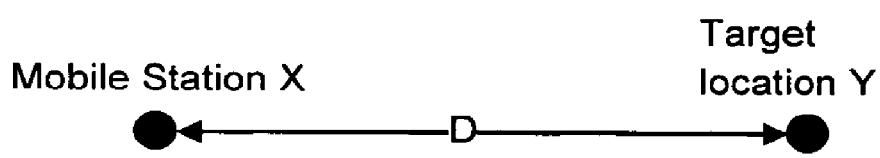
FIG. 2 depicts the determination of a Euclidean distance D between the mobile station X and a target location Y, for use in the determination of the time required to travel the distance D.
Figure 2:
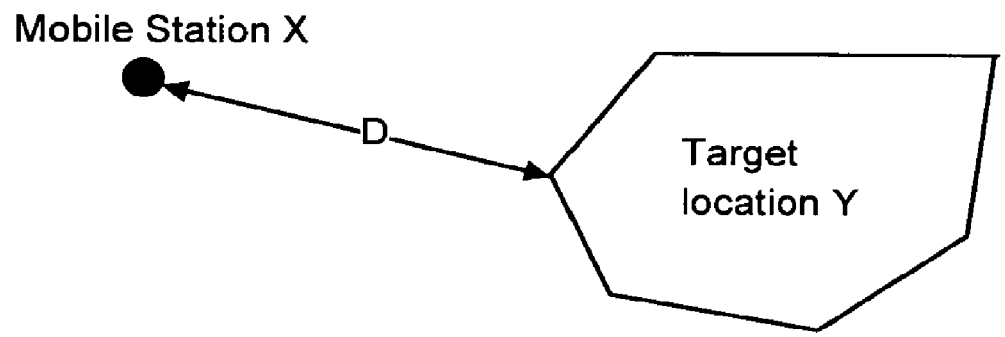

Regarding the methodology used to determine the MATT, any of a wide array of possible approaches to computing travel time can be used. In one example scenario, shown in FIG. 2, the computation can be viewed as a two-step process consisting of (1) a determination of a Euclidean distance D between the mobile station X and a target location Y, followed by (2) a determination of time required to travel the distance D. The target location is of course a function of the alert-triggering condition in question.

In order to compute the distance D, if the current values in location cache are indicative of the last known locations of the two points being latX/longX and latY/longY, then the distance D between the mobile station and the target location can be determined using known formulae for computing distance along spherical surfaces. Of course, different computations take place when the location of a mobile station is given in a different format.

Having computed D, the speed of the mobile station, denoted S, is obtained. This could simply be a maximum speed possible given the current mode of transportation (e.g., car), such as 180 km/h. Alternatively, by way of non-limiting example, the speed of the mobile station could be taken as the instantaneous speed of the mobile station, the average speed of the mobile station in a given time window (e.g., the past five minutes), the maximum of the previous two speeds or the usual speed of the mobile station when in the current geographic area (based on historical data). Myriad other ways of defining an appropriate mobile station speed for the MATT calculation will be known to those of ordinary skill in the art and are within the scope of the present invention. Also, myriad ways of computing instantaneous or average mobile station speed based on location data, timing offsets or other techniques will also be known to those of ordinary skill in the art and are within the scope of the present invention. Finally, the distance is divided D by the speed S to obtain the MATT.

Figure 3:
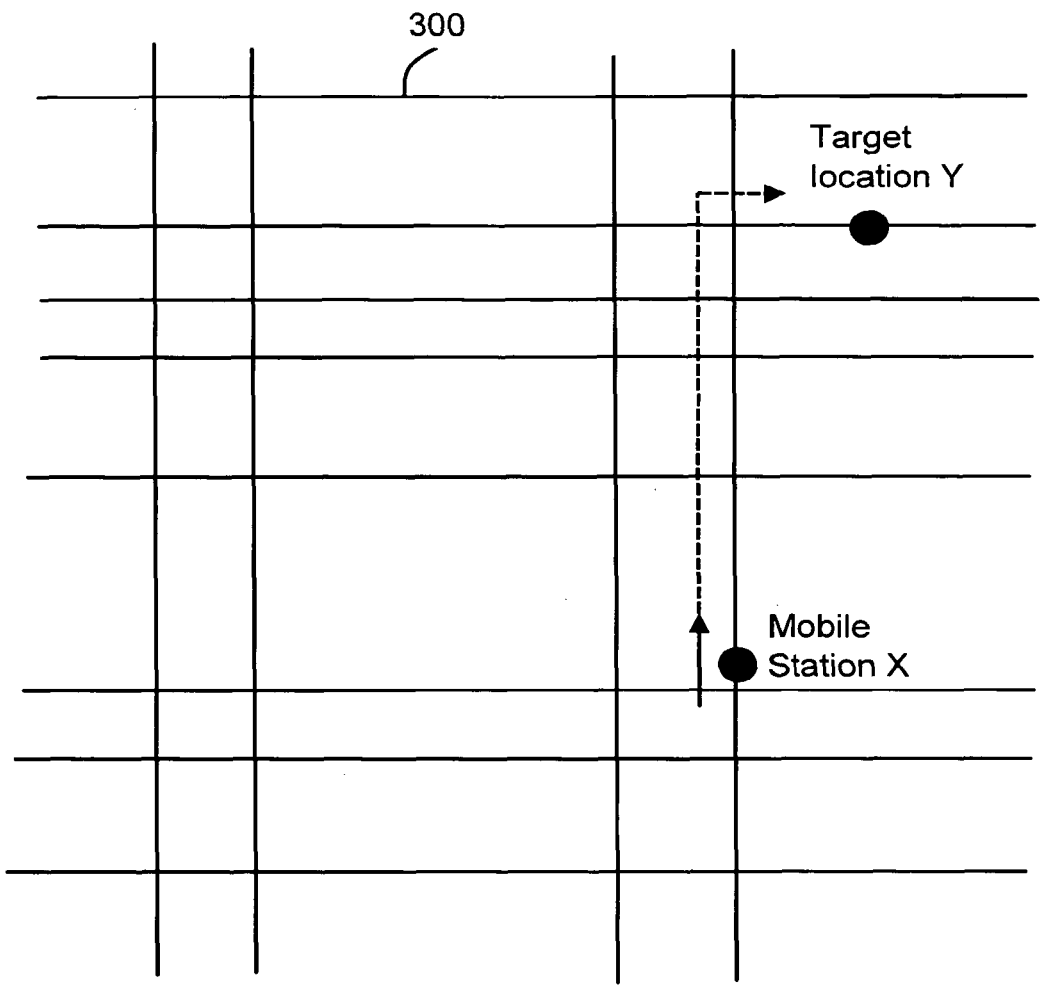
FIG. 3 depicts the determination of the shortest path from a mobile station X to a target location Y according to maneuvers through a road pattern.

Another way of computing the MATT is to use a routing algorithm to determine the shortest path from a particular mobile station to a target location using roads and other available transportation. A non-limiting example of this approach is illustrated in FIG. 3, where the shortest path to the target location Y is constrained to various maneuvers through a road pattern 300. As a first approximation, it is possible to determine the minimum time required to travel this path as a function of prevailing speed limits (taking into account a possible excess of the speed limit by 20%), although the required time may be greater due to traffic lights, stop signs, congestion etc.

Various other distance algorithms can be relied upon to compute the MATT. For more details about suitable distance computation algorithms, the reader is referred to those defined in U.S. patent application Ser. No. 10/039,539 to Klein et al., entitled Representations for Estimating Distance, hereby incorporated by reference herein.

Other algorithms for computing the MATT may rely on short-term prediction or historical knowledge. For example, short-term prediction refers to obtaining location data for some time t2 that is after time t1, where location information is known for t1, but not for t2. So in this context, the requirements engine 170 may determine that a server-predicted location is suitable for the application, because the error probability for this prediction is below some suitable threshold for the requesting application. More specifically, if this is the case, the requirements engine 170 could perform one or more of the following techniques to try to get a predicted location for a particular mobile station:

reliance on recent available information of the particular mobile station (road, speed, direction, time, day), from one or more observations, to place them further along that road;

reliance on some historical information about the user of the particular mobile station (such as location updates or likely routes or likely routes used at certain times of day), in addition to using whatever recent information is available, find a likely location for the user by placing them somewhere on one of those routes, at an endpoint of a route;

reliance on general flows of the movements of groups of users (such as location updates or likely routes or likely routes used at certain times of day), in addition to using whatever recent information is available, find a likely location for the user of the particular mobile station by placing them somewhere on one of those routes, at an endpoint of a route.

From the above, it is apparent that the main role of the requirements engine is to determine the MATT, which informs the request scheduler that updated location data about a particular mobile station is not required before a time $t_0$+MATT in the future (where $t_0$ is the current time).

In a variant of the present invention, it may be advantageous to have the requirements engine compute a time instant before which receipt of updated location data about a particular mobile station will not result in computation of a MATT and hence will be ignored. This time instant may be referred to as the earliest acceptable update time (EAUT) for the particular mobile station. By pushing back the time at which updated location data for the particular mobile station is considered, the requirements engine avoids having to compute a new MATT if updated location data about the particular mobile station is received twice within a short time span, especially if the previously computed MATT was considerably longer than this time span. In other words, in order to economize computation resources, it is within the scope of the present invention to ignore an occurrence of updated location data being written to the location cache if such occurrence closely follows a previous location update that recently prompted computation the MATT.

Thus, the EAUT and the MATT respectively define the beginning and end of an effective time window during which an update of the location data relating to the particular mobile station must occur. Flexibility available in designing this window exists with respect to the EAUT. Of course, the designer of such a window must be cognizant of the trade-off between the total length of the window (generally, the longer the better) with the economy of the computation resources (which would be enhanced by pushing back the beginning of the window and hence making it shorter).

Figure 4:
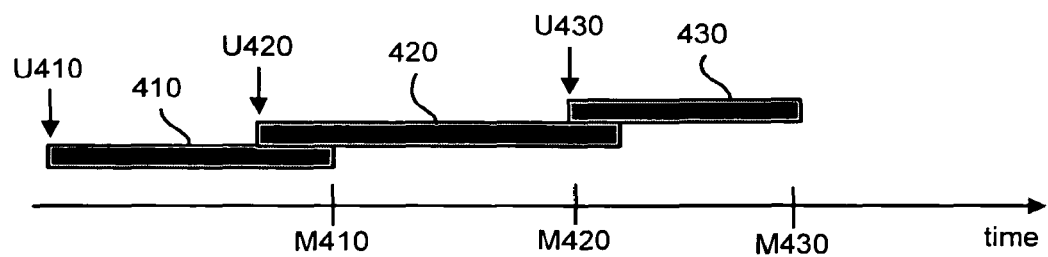
FIG. 4 shows an example of the computation of the EAUT/MATT time window for a particular mobile station, as defined by the requirements engine shown in FIG. 1.

FIG. 4 illustrates the foregoing concept for a particular mobile station, where various instances of the EAUT/MATT time window 410, 420, 430 defined by the requirements engine 170 is plotted along a horizontal time axis 400. It can be observed that updated location data, received at times U410, U420, U430, is always received prior to the respective MATT M410, M420, M430 in effect at the given time. It is noted that if an EAUT were associated with each time window, location updates falling prior to the EAUT would not cause the computation of a new MATT.

It should also be apparent that the beginning of the time window, i.e., the EAUT, may be a time in the past. For example, in the case where an alert-based service is first initiated, it is not necessary to obtain future information about where a particular mobile station is located, since a certain degree of staleness in the information will be acceptable. Advantageously, in such a situation, the alert-based application is satisfied without having to burden the request scheduler with scheduling a request.

Moreover, it should be understood that if more than one alert-triggering condition is applicable (e.g., due to multiple alert-based services being relevant to a particular mobile station), then it is possible to compute different MATTs for the various conditions. In such a case, it is beneficial to perform a consolidation of MATTs. The advantage of consolidation is of course to prevent the entity responsible for obtaining the updated location data from unnecessarily prompting the network 110 for an update of location data about a particular mobile station. By performing a consolidation of MATTs, network bandwidth resources can be spared.

A simple way of producing a single MATT for multiple alert-triggering conditions is to compute the MATT for each of the alert-triggering conditions, each time updated location data is received. However, this might not always be necessary, as illustrated in the following example.

Figure 5:
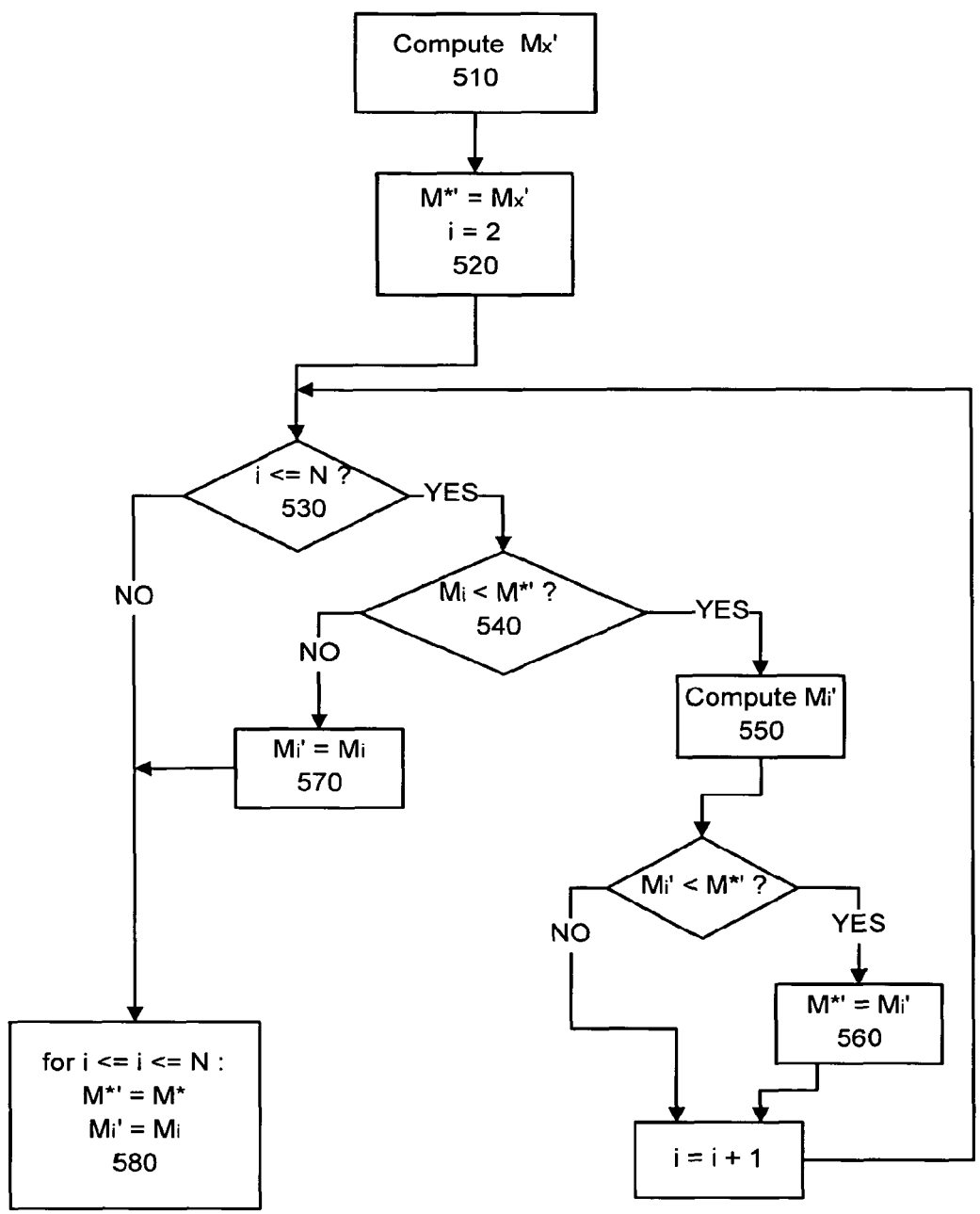
FIG. 5 is a flowchart representation of an algorithm for the efficient consolidation of the MATT for a particular mobile station, according to an embodiment of the present invention.

One example of efficient consolidation of MATTs is now described with reference to FIG. 5. In this case, it is assumed that there are N alert-triggering conditions A1, A2, . . . , AN for the particular mobile station, each with a respective MATT denoted M1, M2, . . . , MN. Upon receipt of updated location data about the particular mobile station, global single MATT denoted M* may be created as follows:

by way of initialization, consider the alert-triggering condition for which the previous MATT was equal to the previous value of M*; in other words, consider the alert-triggering condition Ax for which the corresponding MATT, Mx, was the governing MATT the last time M* was computed.

at step 510 compute a new MATT for alert-triggering condition Ax and call it Mx'. In addition, at step 520, set M*', the new global MATT, equal to Mx'.

for each remaining alert-triggering condition Ai (see step 530), verify if the previous MATT, Mi, is less than M*' at step 540;
if so, compute a new MATT Mi' at step 550; if Mi' is less than M*', then set M*' equal to Mi' at step 560;
if not, do nothing and set Mi' equal to Mi at step 570;
once all remaining alert-triggering conditions will have been considered, the primes are removed at step 580 and thus M*' becomes M*, while Mi' becomes M' for $1 \leq i \leq N$.

From the above, it is apparent that computation of the global MATT requires consideration of a reduced number of alert-triggering conditions, which may advantageously economize computation resources.

Of course, it will be appreciated that the above approach may become quite computationally intensive when multiple alert-triggering conditions may be relevant to multiple mobile stations. Therefore, it is within the scope of the present invention to devise a more memory-efficient technique for handling multiple alert-triggering conditions for groups, or "categories" of mobile stations so as to generate a single MATT per mobile station. Specifically, with additional reference to FIG. 6, a series of data structures Sj is created, where j denotes a "category", such that the following query is supported: given the location of a particular mobile station and the "categories" to which is mapped the particular mobile station, return the exact or approximate "travel time" between the particular mobile station's location and the "nearest" "alert region" for the particular mobile station.

By "category" it is meant a selected group of users, to which a certain common set of alerts may all be relevant. Each mobile station is thus mapped to zero or more categories. There can be assumed to be K categories, $K \geq 1$, with Sj denoting the data structure corresponding to category j of K. By "travel time" it is meant a measurement using a graphical representation of travel time, which could be the minimum cost of a path corresponding two nodes or edges of a graph that is a directed or undirected graph with costs on the edges. By "alert region" it is meant the geographic location which, should a mobile station enter that region, will trigger firing of an alert. By "nearest" it is meant the alert region to which the travel time is minimum.

The following describes (1) what is included in data structure Sj; (2) how data structure Sj returns travel time in response to receiving location data about a particular mobile station and knowledge that the particular mobile station is mapped to category j; (3) how data structure Sj is initially populated; and (4) how data structure Sj is updated.

Figure 6:
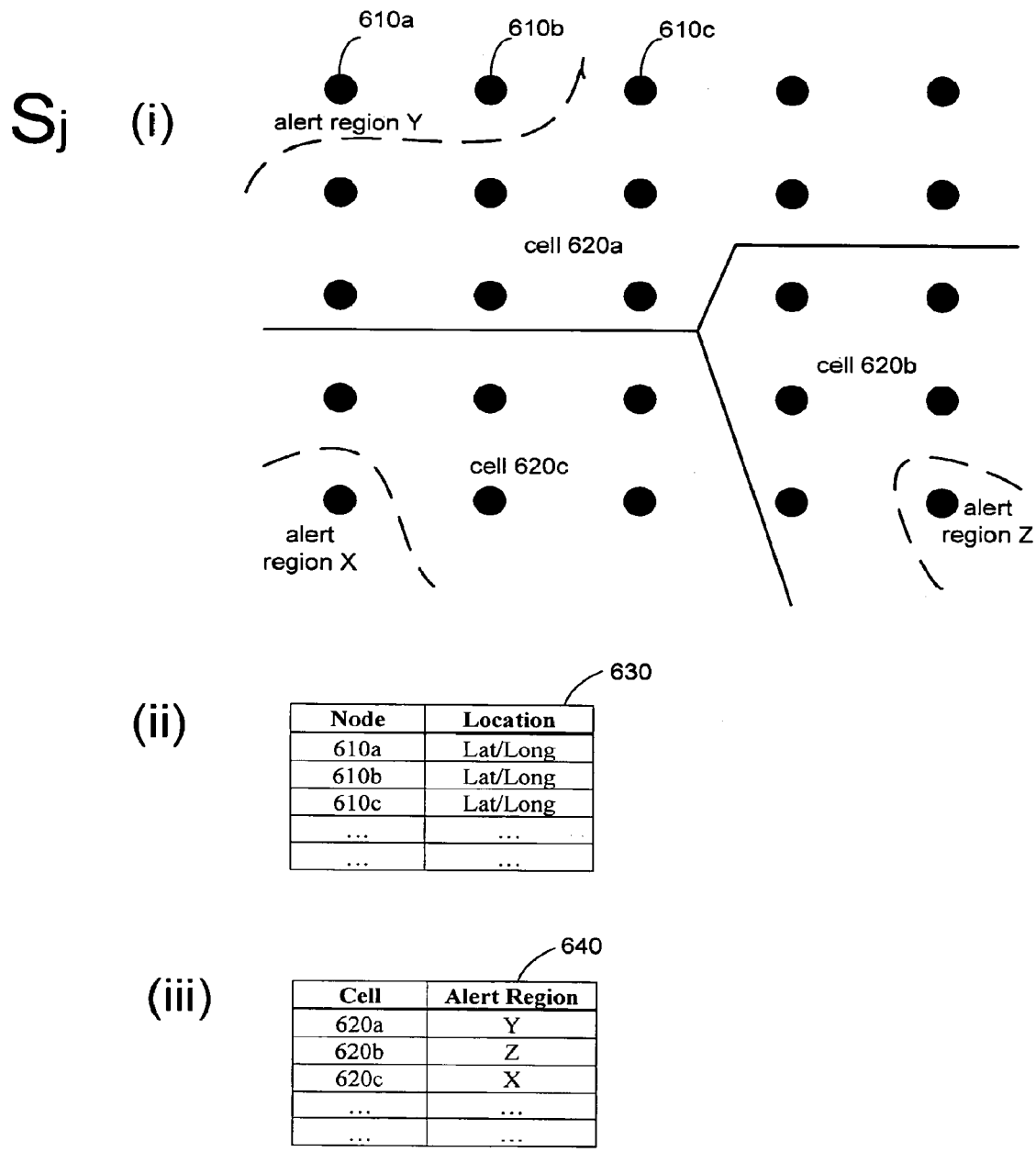
FIG. 6 shows a data structure for handling multiple alert-triggering conditions for groups of mobile stations in order to generate a single MATT per mobile station, according to an embodiment of the present invention.

(1) Data Structure Sj Includes the Following:

(i) a subdivision into cells of the two-dimensional space in which the mobile stations may roam, with the property that for each cell of the subdivision, any mobile stations found within that cell would all be nearest to the same alert region. In FIG. 6, there are three alert regions X, Y and Z and thus three cells 620a, 620b, 620c. In this case, mobile stations in cell 620a would be closest to zert region Y, mobile stations in cell 620b would be closest to alert region Z and mobile stations in cell 620c would be closest to alert region X;

(ii) a point-location data structure 630 for the subdivision created in (1)(i), which is representative of the relationship between the cells established in step (1)(i) and a set of discrete, imaginary nodes 610a, 610b, 610c etc. which cover the plane and have actual positions assigned to them (to assist in computation of travel time); and (iii) a table 640 indexed by cells of the subdivision created in (1)(i), with each entry specifying the alert region nearest to the "nodes" (see (1)(ii)) within that cell. In a variant, the entry may specify the alert region to which the travel time is within a percentage of the minimum travel time from the "nodes" in that cell to any other alert region. By "table" is meant any data structure permitting fast lookup using some kind of index, e.g., array, hash table, balanced search tree.

(2) Data Structure Sj Returns Travel Time in Response to Location Data in the Following Manner:
  (i) use the point-location data structure in step (1)(ii) to determine which cell of the subdivision in step (1)(i) contains the user's current location;
  (ii) use the table in step (1)(m) to determine the alert region associated with the cell found in step (2)(i); and
  (iii) use a cost function or other technique to determine the exact or approximate travel time from the user's current location to the alert region found in step (2)(ii).

Optionally, step (iii) may be preceded by ensuring that the alert region found in step (2)(ii) meets certain eligibility or applicability conditions, which are described further on in this specification.

Figures 7A, 7B, 7C:
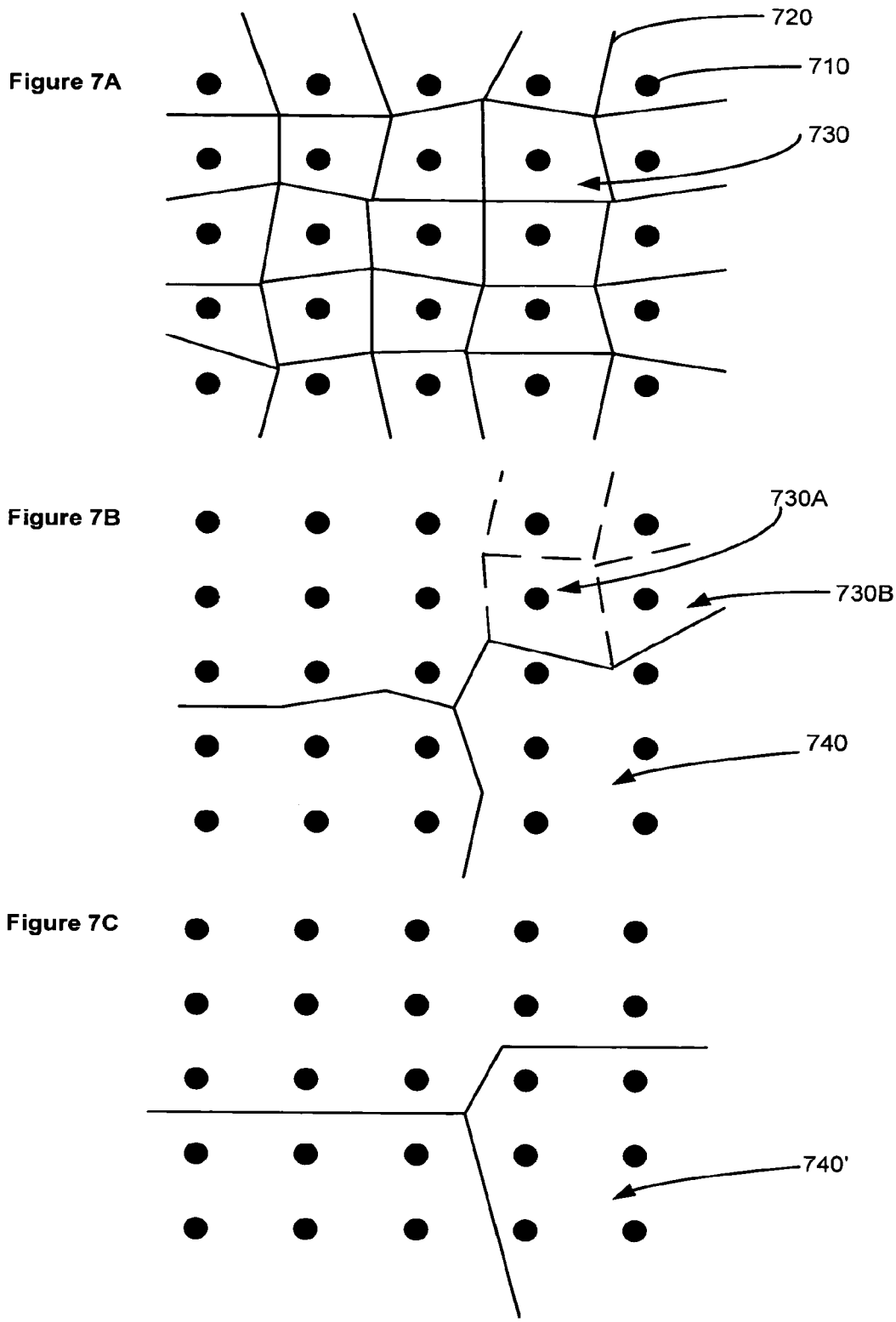
FIGS. 7A-7C illustrate a method for defining the planar subdivision of the data structure shown in FIG. 6, according to an embodiment of the present invention.

(3) Data Structure Sj is Initially Created in the Following Manner:
  (i) compute for each node the nearest alert region applicable to users in category j. Assuming that travel times are represented by an edge-weighted graph, this step can be done by using a simple adaptation of a traditional shortest-path algorithm, such as Dijkstra's algorithm;
  (ii) find a planar subdivision in which each cell contains exactly one node (see FIG. 7A). One such planar subdivision is the Voronoi diagram 720 of the nodes 710. Algorithms for computing the Voronoi diagram of a set of points will be known to those of ordinary skill in the art. Note that this planar subdivision does not depend on the alert regions and therefore it can be computed once and stored until all categories have been processed. The result is the creation of multiple cells 730, one surrounding each node 710;
  (iii) merge together cells of the subdivision having the same nearest alert region (see FIG. 7B). One method for doing this is by repeated application of the following merge step. If there are two adjacent cells (e.g., 730A, 730B) in the subdivision such that the alert region nearest to the nodes in one cell equals the alert region nearest to nodes in the other cell, remove from the subdivision those segments that lie on the boundaries of both cells. Repeat this step until no such adjacent cells remain; this effectively results in larger cells 740;
  (iv) populate the table in step (1)(iii) using the cells 740; and
  (v) the subdivision found in step (3)(iii) defines a partition of the set of nodes, where two nodes belong to the same block of the partition if they lie in the same cell of the subdivision. Apply heuristics to reduce the number of line segments defining the planar subdivision found in step (3)(iii) without changing the partition of nodes. For example, the cells 740 from FIG. 7B will become the cells 740' in FIG. 7C.

Figure 8A:
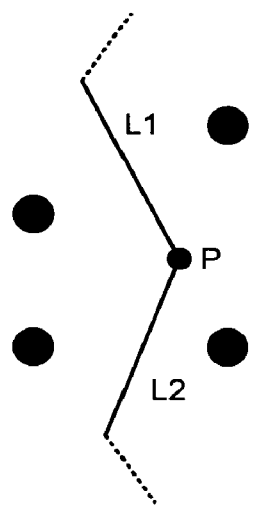
FIGS. 8A-8C illustrate an example of a heuristic for reducing the number of line segments defining the planar subdivision of the data structure shown in FIG. 6.
Figure 8B:
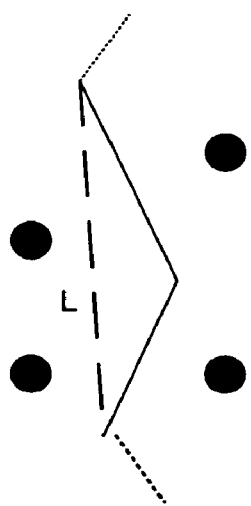
Figure 8C:
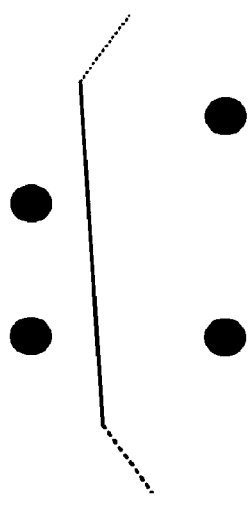

One heuristic that is suitable for use with step (3)(v) uses the following improvements. With reference to FIG. 8A, for example, consider a pair of line segments L1 and L2 sharing an endpoint P such that no other line segment in the planar subdivision is incident to P. With reference to FIG. 8B, let L denote the line segment connecting the endpoint of L1 that is not P to the endpoint of L2 that is not P. Check whether the triangle formed by L, L1 and L2 contains any nodes. If not (which is the case in FIG. 8B), replace L1 and L2 by L in the planar subdivision (see FIG. 8C). The heuristic is to greedily apply such improvement steps until none remain to be applied.

Other heuristics that are suitable for use with (3)(v) can be derived from those given in a paper by Estkowski and Mitchell, "Simplifying a Polygonal Subdivision While Keeping It Simple", Proceedings, Symposium on Computational Geometry, 2001, pp. 40-49, and in the papers cited by this paper.

Another alternative to (3)(v) is to introduce a small amount of approximation error. This is done by applying heuristics to the subdivision found in step (3)(iii) to reduce the number of line segments. Specifically, allow a node V to more to a different cell C if the travel time from the node V to the alert region associated with cell C—from the table in step (1)(iii)—approximates (to within a prescribed or absolute error) the travel tine from node V to the nearest alert region. For example, modifying the heuristic described in step (3)(v), if the triangle formed by L, L1 and L2 contains nodes, then replacing L1 and L2 by L would change which cell contains those nodes; still, perform the replacement if for each of those nodes the travel time to the alert region associated with the new cell is not significantly greater (e.g., by 10%) that the travel time to the actual nearest alert region.

(4) Data Structure Sj is Updated in the Following Manner:
  (i) find the set of nodes whose travel time to the new alert region is less than the travel time to the previously chosen alert. This step can be done quickly by using a traditional shortest-path search rooted at the new alert region, modified not to explore the neighbours of any node V whose travel time to the new alert region is greater than the travel time to the alert region associated with the cell containing node V; and
  (ii) create a polygon (or set of polygons) enclosing the set of nodes found in step (4)(i), and excluding other nodes. This can be done in several ways. One way is to find the convex hull of the set of nodes found, and then perturb the boundary of the convex hull to exclude other nodes. Another way is to start with a subset of the planar subdivision found in step (3)(ii), namely the subset consisting of the boundaries of cells containing nodes found in step (4)(i). As in step (3)(iii), repeatedly merge together adjacent cells. If the latter approach is taken, then the planar subdivision found in step (3)(ii) should be retained. This will reduce memory requirements, since there is only one such planar subdivision, rather than one per category.

With the requirements engine 170 generating a time window during which updated location data about a particular mobile station is allowed to be received, the request scheduler 180 can more efficiently manage the issuance of requests for location updates, with the net effect of reducing the strain on the bandwidth resources of the network.

Specifically, the program element that provides the functionality of the request scheduler 180 has two main modules; (1) a scheduling module that performs the various computations to determine when the locations requests are to be serviced by the PDE and (2) I/O module that allows the scheduling module to receive/send data from/to external. entities.

The request scheduler 180 processes two types of location requests. The first type is an immediate type that requires immediate servicing. The second type is a delayed location request that requires servicing by the PDE 160 no later than a certain time T. Delayed location requests are associated with respective expiry times that specify the deadline for servicing the request. The request scheduler 180 receives location requests data elements that are to be serviced. Each location request data element corresponds to a location request. The location request data element includes, in addition to the location data being sought parameters that enable the request scheduler 180 to determine when it is appropriate to service the request. One of the parameters is the type of request, either immediate or delayed. In the case of a delayed request, expiry time data is provided.

It should be noted that the request scheduler 180 does not need to receive all the information regarding the location requests. Applications where the request scheduler 180 receives only the expiry times data and any other data necessary to determine when the various location requests are to be services, can be contemplated without departing from the spirit of the invention.

The request scheduler 180 determines when location request are to be serviced such as to avoid overloading the PDE 160. Several scheduling approaches can be implemented, either in combination or separately such as the PDE 160 is used more efficiently.

One such scheduling approach is to artificially postpone the servicing of delayed type requests. By "artificially postponing" is meant that the servicing of a location request is delayed for a certain time even when the PDE 160 is available to service the location request immediately or before the request for service is actually sent to the PDE 160. The artificial postponing of the servicing of a delayed location requests provides the request scheduler 180 with the ability to prioritize the location requests such that more location requests are being serviced by the PDE 160, without exceeding its capacity. In addition, since the location data is not needed until the deadline T, and, since the freshest data is the most useful, the later the request is satisfied (up to time T), generally the better.

The artificial postponing of the servicing of a delayed-type location request can be done according to a fixed approach or according to a flexible approach. By "fixed approach" is meant that the servicing is postponed by a fixed period of time without exceeding deadline T. The "flexible approach" involves a computation to adjust the postponing based on two parameters: (1) to spread out the location requests to avoid exceeding the capacity of the PDE 160; (2) deliver the location data as close as possible to the deadline T. The reader will appreciate that other strategies to regulate the artificial postponing can be implemented without departing from the spirit of the invention.

Another scheduling approach that can be used separately or in conjunction with the previous scheduling approach is to identify multiple location requests that can be satisfied with the same location data, such as several location requests made over a period of time by the same Location-Based Services (LBS) application, and service those requests with the same location update. In the case of delayed-type requests, this can be accomplished by timing the servicing of all the requests such that it occurs prior to their respective expiry times. More specifically, the various requests that can be aggregated together are identified along with their respective expiry times, and then ordered by expiry time. A request for service is then sent to the PDE 160 such that the location request having the earliest expiry time will be serviced adequately. When the location data is received from the PDE 160, that location data satisfies all the aggregated location requests. This approach supports artificial postponing, described earlier, at the condition that all the expiry times of the aggregated location requests are not exceeded.

Yet, another possible scheduling approach is to take advantage of asynchronous location data to service location requests. Location data can be obtained from the PDE 160 in a synchronous fashion, in other words a request for location data is sent to the PDE 160 and the PDE 160 returns a response to this request that contains the location data. Location data can also be obtained asynchronously, as discussed in detail in the above-referenced patent application to Ioppe et al., the contents of which are incorporated herein by reference. Such asynchronous location data is stored in a location cache 150.

When the request scheduler 180 receives an immediate-type request, the request scheduler 180 communicates with the location cache 150 to determine if the location cache 150 contains location data that can satisfy the request. In the affirmative, the location requests in the request scheduler 180 that are satisfied by this location data are negated and no query for location data is made to the PDE 160. To avoid instances where location data that is too stale is made available to the application that issued the location request, the immediate-type location request is modified to include a field indicating if it will accept stale data and the degree of staleness (the earliest data that is acceptable). In addition, the location data stored in the location cache is associated with a timestamp. Accordingly, the request scheduler 180 can determine if the location cache 150 contains data that can satisfy the immediate-type request; in the affirmative the location request is negated from the request scheduler 180; in the negative a request is made to the PDE 160 to obtain fresh location data and the location request negated immediately thereafter.

In the case of delayed-type requests, the same operation can be performed with the exception that the location cache 150 can be searched several times, as the location request is being artificially postponed. If no suitable location data is found in the location cache 150, a request is then made to the PDE 160 such the delayed-type request can be serviced prior to its expiry time.

Yet another possible scheduling approach is to examine location data sent from the PDE 160 to the location cache 150 that services an immediate-type location request (this location data is synchronous) to determine if it can also be used to service a delayed-type request that is presently outstanding in the request scheduler 180. If the affirmative, the location data services both requests, the immediate-type and the delayed-type.

A specific example of the operation of the request scheduler 180 according to one or more of the previously discussed scheduling approaches will be provided below. It is to be understood that this example is only an illustration of the operation of the request scheduler 180 and should not be interpreted in a limiting manner.

In what follows, assume that the PDE 160, has a given, fixed, maximum load. Assume that this load is given as N requests per second. The request scheduler 180 divide time into discrete time slots, such that each second is divided into N slots. The objective of the request scheduler 180 is to place delayed-type requests into time slots, no more than one per slot, such that if possible, no request is placed in a slot where the time of servicing that slot is greater than T, and, subject to this constraint, requests are assigned to time slots that are as late as possible. For simplicity of presentation, assume T is given in units of 1/N of a second, so the slot corresponding to time T is followed by the slot corresponding to time T+1.

There are cases where such a scheduling may not be possible. For example, if more than N requests are made per second for a long enough period, it will be impossible to service these requests without exceeding the PDE 160 load limit. Under such conditions, location requests will be delayed, and if the situation continues, eventually requests will be dropped.

Given a new delayed-type location request, the request scheduler 180 finds the latest slot S such that the time for servicing that slot is less than T, and such that either S is empty or S is occupied with a location request with an expiry time less than or equal to T. In either case, the new location request is placed in time slot S. If the slot was previously occupied, push the original location request one slot earlier. If the previous slot was also occupied, push this location request one slot earlier as well. Repeat as necessary until an unoccupied time slot is reached or until there are no more slots (i.e. slots are occupied up to the slot corresponding to the present time). (If the latter occurs, the new location request cannot be serviced by time T; and an attempt should be made to schedule it by time T+1.)

If at any time a location update comes in for a user due either to an immediate request (synchronous) or to a phone registration or other telephony event (asynchronous), any delayed-type request corresponding to that user can be removed from its slot and serviced via the location update.

Note that both immediate-type and delayed-type requests may be resolved by using cached values depending on the time stamp of the cached location data and the particular requirements of the request. If multiple delayed-type requests are entered for the same user (i.e. overlapping "windows" of acceptable request times), they are resolved with a single request.

One possible approach to implementing the algorithm described above is to provide the request scheduler with a storage medium that arranged as a circular array, assigning each element of the array to a time slice, and mimic the procedure described in the last section. This, however, could lead to performance problems, as insert/remove operations require O(n) processing time (n being the number of outstanding scheduled requests).

Another possible approach is to use a search tree data structure (such as a binary search tree) in which each pending delayed-type request is represented by a node, such that the nodes are ordered (in search-tree order) according to the expiry times T of the corresponding requests; in addition to the information about the request (including the expiry time T), a small amount of auxiliary information is maintained at each node to permit quick computation of the time at which the next request should be issued to the PDE 160. The auxiliary information maintained at a node is dependent only on the descendants of that node in the search tree (a node's descendants include itself) and should be easily computed from the auxiliary information at the children of that node.

When a new delayed-type request arrives, a corresponding new node is inserted into the tree; the auxiliary information for the new node can be quickly computed and the auxiliary information for the ancestors of that node can be recomputed. When a request is deleted (because it has been issued to the PDA 160 or because a location update for the corresponding user has received), the corresponding node is deleted, and the auxiliary information updated at the nodes that were ancestors of the deleted node. Moreover, if rotations in the search tree take place (as required by some search tree data structures to maintain balance), the auxiliary information can be recomputed for the nodes whose descendants change as a result of the rotations.

Search tree data structures (e.g. red-black trees) are known that support insertions and deletions in O(log n) time where n is the number of nodes. Using such a structure ensures that it takes O(log n) time to enter a request and O(log n) time to determine the time of the next request to be issued to the PDE 160.

One way to realize the above is as follows. The search tree is a binary search tree (each node has at most two children). The auxiliary information at a search-tree node has two integer labels, u and v. The label v is equal to the number of descendants of the given node in the tree. (The descendants of a node include the node itself.) The label u represents the earliest time slot in which a request would be scheduled if the only requests entered into the system were those of the node's descendants in the tree. One important property of a node's labels u and v is that they depend only on the descendants of that node.

A third label w represents the actual scheduling time of the request corresponding to this node taking into account all requests entered into the system; the w labels are not maintained but are computed as needed and then discarded. The method for computing the w label of a node is described later. It is important to the efficiency of the data structure that the w labels are not maintained (if they were to be maintained, many such labels might have to be changed when a new request was processed, and changing those labels would require lots of time).

As mentioned earlier, when a new node is inserted into the binary search tree (as part of the processing of a new location request), the values for the new node's labels u and v are re-computed, and the values for the labels of the new node's ancestor's are re-computed (since each ancestor's set of descendants has changed). These computations are carried out starting at the new node and moving up the tree (towards the root) ancestor by ancestor. Similarly, when a rotation is carried out in the search tree, the values of the labels u and v must be recomputed for those nodes whose descendants are changed by the rotation. (A rotation in a binary search tree changes the descendants of only two nodes.)

For each node, the value of v is computed as 1+vL+vR, where vL is the value of the v label of the node's left child (if present, else 0) and vR is the value of the v label at the node's right child (if present, else 0). The value of u is computed as the minimum of uL, T−vL, and uR−vL−1, where uL is the value of the u label at the left child, uR is the value of the u label at the node's right child, and T is the deadline of the request corresponding to the node.

Since every pending request is represented by some descendant of the root of the search tree, the value of the u label at the root gives the earliest time slot at which a request must be sent to the PDA. Thus the system can check at a given time whether a request needs to be sent at that time by inspecting the u label and comparing its value to the current time. The next request to be sent is the request represented by the leftmost descendant of the root; a simple procedure suffices to find this node.

To determine the earliest time slot at which a request must be processed, the system examines the u label at the root of the search tree. The system can compare the time corresponding to that earliest time slot with the present time to determine if a location request must be processed at the present time. Computing this for a given node can be done efficiently as follows:

First compute w at the root of the binary search tree. This is done by starting with the right-most node and working back up to the root. Along the way, intermediate w values can be calculated in terms of u, v and if present, w of the right-child. Starting from the root, w values of left and right-children can be computed locally as needed. Once w values (i.e. scheduling slots) can be calculated for requests corresponding to internal nodes, removing an appropriate request for scheduling is simply a matter of seeing if one or more requests are ready to be removed from the binary search tree.

In addition to the search tree itself, there may be another data structure (e.g. a hash table) that identifies related location requests. For example, if there are location requests associated to a user in a wireless network, this data structure maps for each user all the nodes corresponding to requests for that user's location. When a location update arrives for a user, this data structure allows the system to serve the pending requests for that user's location and to delete the corresponding nodes from the search tree (updating the auxiliary information for their ancestors).

Once the request scheduler 180 has determined an order for servicing the various requests received at its I/O, it communicates with the PDE 160 such that those requests can be serviced. The request scheduler 180 can send the entire location request information to the PDE 160 or a pointer to that information with specific data indicating the order for servicing the requests. Once a request is serviced by the PDE 160, the location data returned by the PDE 160 is sent to the location cache 150. Alternatively, the PDE 160 can issue the location data directly to the entity that implements the location application that issued the location request. This option requires that the address of the entity is sent to the PDE 160 in the location request data.

The reader will appreciate that a wide variety of messaging schemes can be used to allow the transmission of information from the entity that issues location requests, the request scheduler 180 and the PDE 160, without departing from the spirit of this invention.

Upon receipt of updated location data about a particular mobile station, the alert engine decides whether or not to trigger an alert to be fired having regard to a particular alert-based service. This is effected by first determining for which alert-based services, if any, at least one corresponding alert-triggering condition is met by the particular mobile station. If such a condition is met, the alert engine sends a trigger to the alert-based application, which signals to the latter that it should fire an alert.

It should be noted that the mobile station may or may not be the recipient of the alert. For the purposes of describing the present invention, it is not necessary to go into any detail regarding the actions that may taken by the alert-based application upon receipt of a message from the alert engine that denotes that an alert is to be triggered.

In accordance with an embodiment of the present invention, an alert-triggering condition will be related to the location of a mobile station as provided in the location cache. Such location data may be written to the location cache upon receipt of a location update from a passive position determination entity or from an active position determination entity responsive to a request for update location data issued by the request scheduler.

In various embodiments of the present invention, an alert-triggering condition is considered as having been met by a particular mobile station if the updated location data about the particular mobile station is indicative of the particular mobile station:
  being located within a predetermined maximum distance from a target location at a predetermined future time;
  being located within a predetermined maximum distance from a target location during a predetermined time range;
  having entered a predetermined target geographic area;
  having exited a predetermined target geographic area;
  being located within a predetermined target geographic area at a predetermined time;
  being located outside a predetermined target geographic area at a predetermined time.
  being headed towards a congested portion of a pre-defined travel route (which may have been input by the user of the mobile station or computed from historical data).
  being headed towards a particular direction or location (e.g., home, work);
  being headed away from a particular direction or location;
  being headed towards an area congested with traffic;
  having a speed exceeding a predetermined upper bound; and/or
  having a speed below a predetermined lower bound.

Clearly, the reliance upon a MATT to guarantee that the above alert-triggering conditions are met requires additional assumptions about the suddenness with which the particular indicator (e.g., heading, speed) can change in time. For example, it may be safe to assume that a mobile station travelling along a straight portion of highway will continue in that direction and will not make a sudden right-angled turn before the next location update is received.

In another embodiment of the present invention, an alert-triggering condition is considered as having been met by a particular mobile station if the updated location data about the particular mobile station is indicative of the particular mobile station being located within a predetermined target geographic area for a predetermined duration. In some instances, predetermined "duration" may be defined as a predetermined number of consecutive times updated location data is received at the input, while in other instances, the predetermined "duration" maybe defined as a predetermined length of time. It is also possible to define predetermined "duration" as a combination of time and number of consecutive location updates.

In yet another embodiment of the present invention, an alert-triggering condition is considered as having been met by a particular mobile station if the updated location data about the particular mobile station is indicative of the particular mobile station being located for a given amount of time within a peripheral target area. There may be more than one increasingly peripheral area. The amount of time for each such peripheral area can be directly related to how peripheral the area is relative to the target area, in other words, the more peripheral the area, the longer the mobile station will have to occupy that area before the alert engine will trigger an alert.

Figure 9:
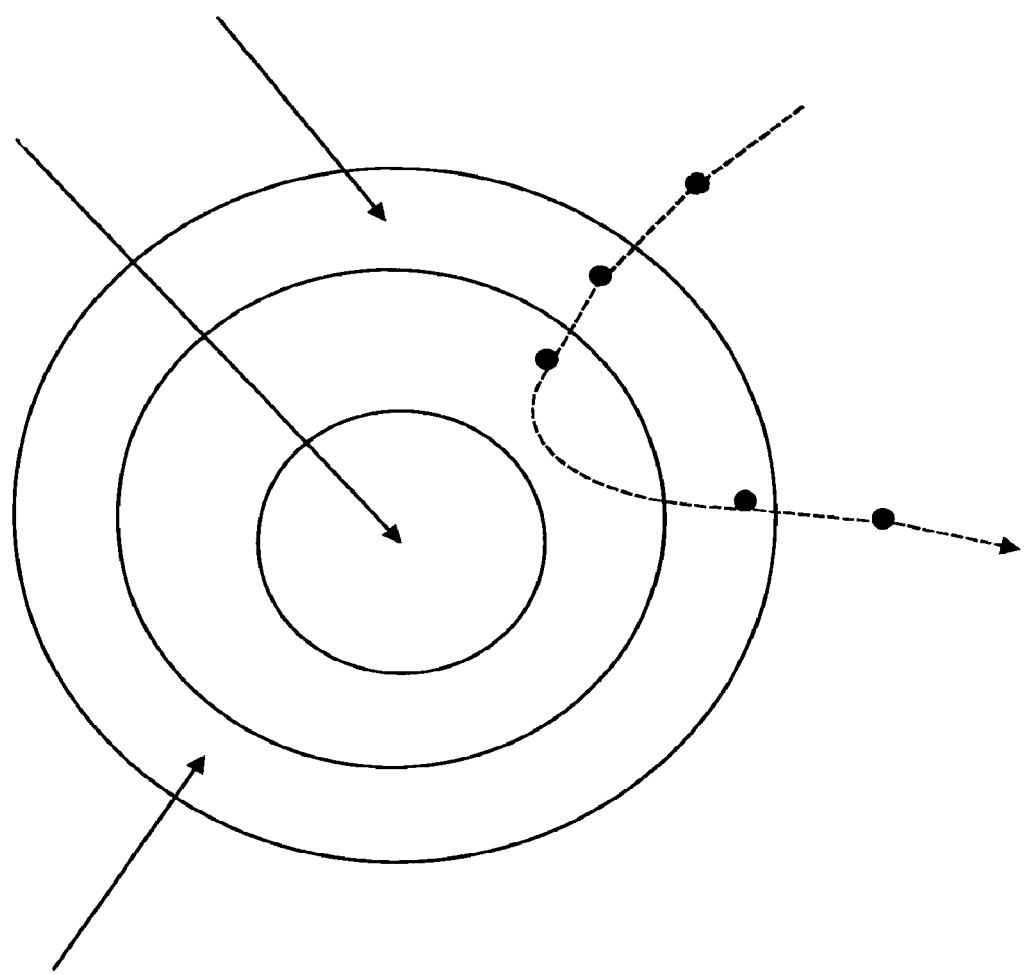
FIG. 9 illustrates a graphical determination by the alert engine of whether an alert-triggering condition is met by a particular mobile station, on the basis of whether the particular mobile station is located for a given amount of time within a peripheral target area, according to an embodiment of the present invention.

With reference to the non-limiting example shown in FIG. 9, if the target region is a circle B0, for example, then several concentric bands B1, B2 containing increasingly greater radii are created around the target region B0. Each such band is associated with a particular amount of time or number of location updates during which a particular mobile station must be found within that band in order to trigger an alert. Thus, instead of being triggered only when the particular mobile station enters the target area B0, the alert engine 190 relaxes this requirement and is equally satisfied with seeing multiple observations of the particular mobile station in one of the peripheral bands B1, B2. This may be advantageous in the case where the target area B0 is arbitrarily chosen or is in need of better definition at the initial stages of a service offering. Also, there may be a cost advantage to triggering the firing of an alert when a particular mobile station is "close" to the target region B0 for a long period of time rather than to expend resources continuously monitoring whether the particular mobile station will or will not actually enter the target area.

Figure 10:
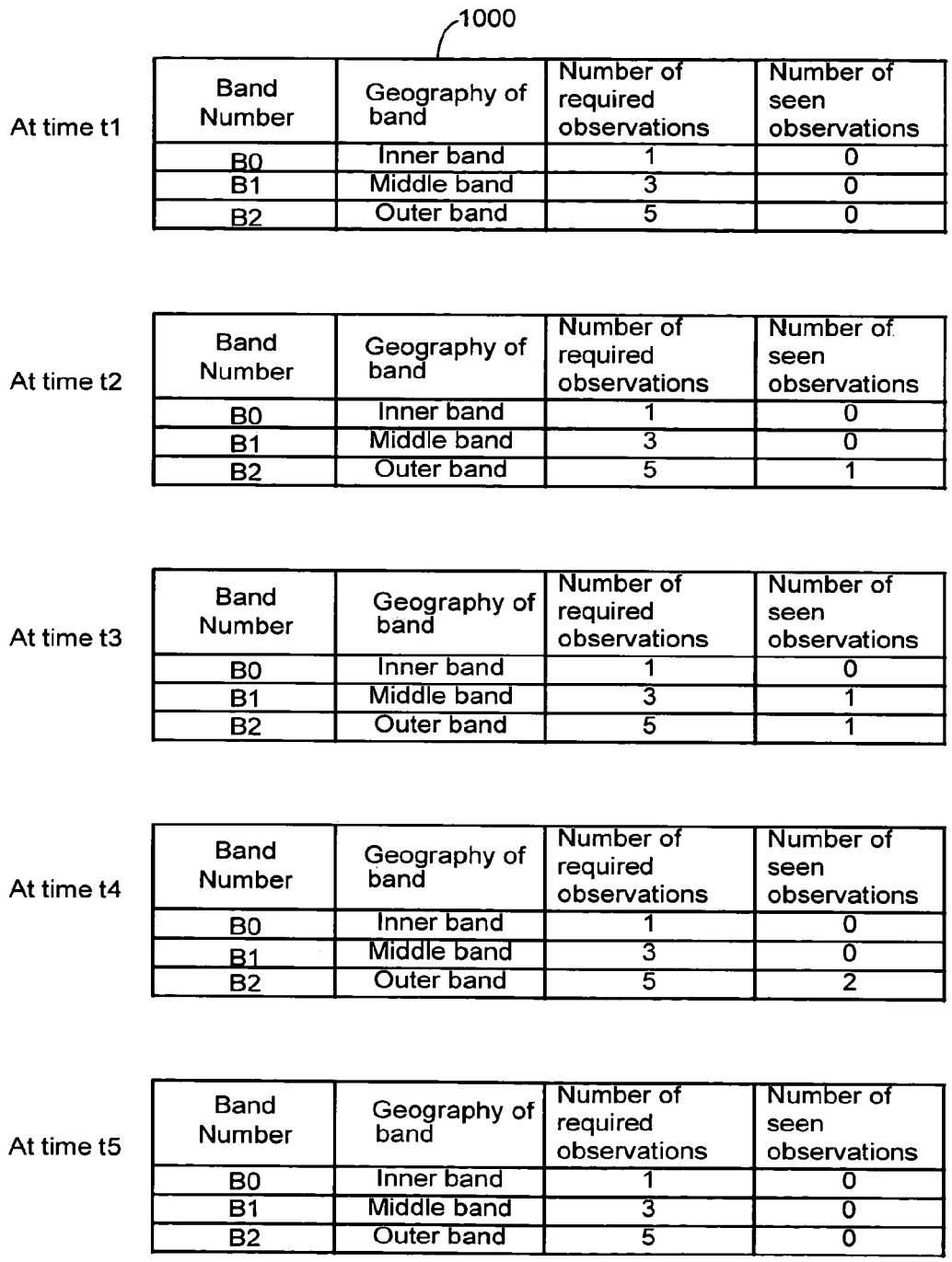
FIG. 10 shows evolution tables representative of the monitored behavior of the particular mobile station for the example of graphical determination shown in FIG. 9.

With continued reference to FIG. 9 and with additional reference to FIG. 10, there is shown an example of evolution of a table 1000 that may be stored in the alert engine for monitoring the behaviour of a particular mobile station. It is noted that for the purposes of this example, it has been assumed that the alert-triggering condition will be satisfied in this case if the mobile station in question spends five time instants or location updates in band B2, three time instants or location updates in band B1 or if a single observation is encountered within the target area B0. The term "count" in respect of a band is hereinafter used to refer to the number of observations of the mobile station in that band.

At time t1, the mobile station is outside either of the bands and the count for each of the bands is zero. At time t2, the mobile station is located within band B2, which increases the count for band B2 to 1. At time t3, the mobile station enters band B1, which increases the count for band B1 to 1. At time t4, the mobile station re-enters band B2, which now increases the count for band B2 to two but resets the count with respect to band B1. Finally, at time t5, the mobile station leaves band B2 without re-entering band B1, which brings the count for all bands back down to zero. In this case, therefore, an alert is not triggered.

From the above, it will be appreciated that under certain conditions, it may be beneficial for the alert engine not to perform an evaluation of whether an alert-triggering condition is satisfied upon learning of a location update. For example, the requirements engine will have determined a minimum alert triggering time (MATT) regarding a particular mobile station, in which case the receipt of updated location data prior to the MATT provides little or no reason in having the alert engine evaluate whether an alert-triggering condition for the particular mobile station is satisfied. Such a condition will not be satisfied, since this is the way the MATT is defined. Hence, not evaluating whether the condition is met will save computational resources in the alert engine. However, it may in some cases be prudent to nonetheless evaluate whether the condition is met, as a backup measure in case the requirements engine has made a mistake in computing the MATT (e.g., a false assumption about mobile station speed).

Other conditions, which can be termed eligibility or applicability- conditions, maybe applied in addition to the location-based conditions described above. For example, firing of an alert associated with an alert-based service might be made possible only if the particular mobile station is a member of a selected group of mobile stations, such as a group of mobile stations associated with users sharing a common demographic characteristic or subscribed to a common alert-based service or a common behavioural characteristic. The latter example can refer to personal habits or preferences, for example. In, other cases, the term "behavioural characteristic" is meant to encompass the recognition of a pattern in time regarding the turning on and off of a mobile station or the establishments frequented by the user of the mobile station.

In other cases, firing of an alert associated with an alert-based service is additionally conditional upon an alert not having been triggered during a predetermined length of time or upon the current time falling within a predetermined range (e.g., an evening or a weekday).

Figure 11:
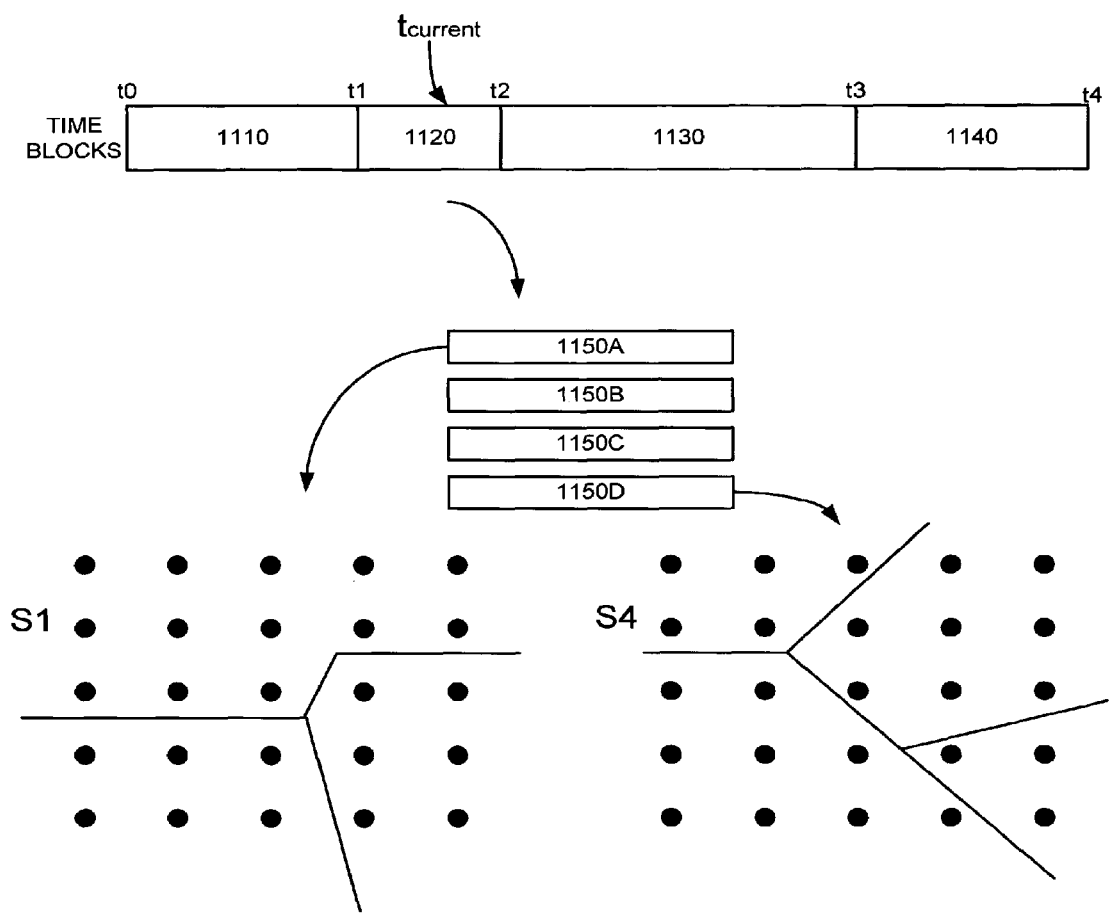
FIG. 11 shows a data structure for use by the alert engine in handling time dependent alert-triggering conditions, according to an embodiment of the present invention.

To reduce primary memory requirements in the alert engine, time dependent alert-triggering conditions can be handled in the following manner with reference to FIG. 11. Firstly, a set of disjoint time blocks 1110, 1120, 1130, 1140 is defined such that each time-dependent alert triggering condition requires that the current time $t_{current}$ be in one of the time blocks. In the illustrated example embodiment, the current time $t_{current}$ is in time block 1120. For each time block, a data structure is constructed for handling all the location-dependent alert-triggering conditions relevant to that time block; such a data structure may conveniently have the form of the Sj defined earlier. In the illustrated example embodiment, there are four data structures 1150A, 1150B, 1150C and 1150D, corresponding to data structures S1, S2, S3 and S4. The data structures for all time blocks are stored in secondary memory, while the data structure for the time blocks corresponding to the current time (in this case time block 1120) is stored in primary memory.

As the current time changes from one time block to another, the alert engine frees the storage being used to hold the data structure currently in primary memory (the data structure used for handling location-dependent alert-triggering conditions for the old time block), then loads from secondary memory the data structure used for handling location-dependent alert-triggering conditions for the new time block.

It will thus be appreciated that the above technique allows an implementation whereby primary memory can be made only as large as necessary to contain the largest one of the data structures corresponding to the various disjoint time blocks.

Those skilled in the art will appreciate that in some embodiments of the invention, the functional modules of the alert manager may be implemented as pre-programmed hardware or firmware elements (e.g., application specific integrated circuits (ASICs), electrically erasable programmable read-only memories (EEPROMs), etc.), or other related components.

In other embodiments, the functional modules of the alert manager may be implemented by an arithmetic and logic unit (ALU) having access to a code memory (not shown) which holds program instructions for the operation of the ALU. The program instructions could be stored on a medium which is fixed, tangible and readable directly by the processor, (e.g., removable diskette, CD-ROM, ROM, or fixed disk), or the program instructions could be stored remotely but transmittable to the processor via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

The program instructions stored in the code memory can be compiled from a high level program written in a number of programming languages for use with many computer architectures or operating systems. For example, the high level program may be written in assembly language such as that suitable for use with a pixel shader, while other versions may be written in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

What is claimed is:

1. An apparatus for scheduling servicing of location requests by a position determining entity (PDE) and for providing triggers for firing alerts in a communications network adapted to provide alert based services for a plurality of mobile stations, the apparatus comprising:
   a) an input for receiving expiry times data indicative of a plurality of expiry times relating to respective location requests, the expiry times comprising at least one expected earliest future time at which at least one alert condition is capable of being met by a particular mobile station;
   b) a scheduler for processing the expiry times data for determining an order for servicing the location requests by the PDE at least in part based on the expiry times of the location requests and a requirement to schedule a request to obtain updated location data about the particular mobile station in advance of the at least one expected earliest future time;

c) an output for interfacing with the PDE allowing the PDE to service the location requests according to the order determined by said scheduler; and d) at least one engine for determining, on the basis of updated location data from the PDE about the particular mobile station, for which alert-based services, if any, at least one corresponding alert condition is met, and for generating a trigger to fire an alert associated with each alert-based service for which at least one corresponding alert condition has been met by the particular mobile station.

2. An apparatus as defined in claim 1, wherein said scheduler includes a storage medium defining a sequence of slots for holding data elements according to the order for servicing the location requests by the PDE.

3. An apparatus as defined in claim 2, wherein each data element in said storage medium is associated to a location request.

4. An apparatus as defined in claim 2, wherein said scheduler is operative to re-compute the order of the data elements in said storage medium when new expiry times data associated with a new location request is received at said input.

5. An apparatus as defined in claim 4, wherein each slot in said sequence of slots corresponds to a point in time at which the position determination equipment is expected to service the location request of a data element stored in the slot.

6. An apparatus as defined in claim 5, wherein the re-computation includes for a new location request, identifying a slot in said sequence of slots that corresponds to a point in time for servicing the new location request that is within the expiry time of the new location request.

7. An apparatus as defined in claim 6, wherein the re-computation includes identifying a slot in said sequence of slots that corresponds to a latest point in time for servicing the new location request, without exceeding the expiry time of the location request.

8. An apparatus as defined in claim 7, wherein if the slot that corresponds to the latest point in time for servicing the new location request is vacant, said scheduler is operative for storing a data element associated to the new location request in the slot that corresponds to the latest point in time.

9. An apparatus as defined in claim 8, wherein if the slot that corresponds to the latest point in time for servicing the new location request is occupied by a data element associated with a prior location request, then said scheduler is operative for:

a) displacing the data element associated with the prior location request to a slot corresponding to an earlier point in time for servicing the prior location request to vacate the slot containing the data element associated with the prior location request;

b) inserting the data element associated with the new location request in the vacated slot.

10. An apparatus as defined in claim 2, wherein the data elements are arranged according to a search tree.

11. An apparatus as defined in claim 10, wherein each data element is associated to a location request and each data element is represented by a node in said search tree.

12. An apparatus as defined in claim 11, wherein the nodes of said search tree are ordered according to the expiry times of the respective location requests.

13. An apparatus as defined in claim 12, wherein each data element includes a first label containing information about a number of descendants of the node associated with the data element.

14. An apparatus as defined in claim 13, wherein each data element includes a second label containing information identifying a time slot at which a location request is to be serviced.

15. An apparatus as defined in claim 14, wherein said scheduler is operative to compute an actual time to service a given location request based at least in part on the first and second labels of nodes in said search tree.

16. A computer readable storage medium including a program element for execution by a processor to implement an apparatus for scheduling servicing of location requests by a position determining entity (PDE) and for triggering the firing of alerts in a communications network adapted to provide alert based services for a plurality of mobile stations, comprising:

a) a scheduling module for accepting as input expiry times data indicative of a plurality of expiry times comprising at least one expected earliest future time at which at least one alert condition is capable of being met by a particular mobile station relating to respective location requests for computing an order for servicing the location requests by the PDE at least in part based on the expiry times of the location requests and a requirement to schedule a request to obtain updated location data about the particular mobile station in advance of the at least one expected earliest future time;

b) an output module for interfacing with the PDE allowing the PDE to service the location requests according to the order determined by said scheduler; and c) at least one module for determining, on the basis of updated location data from the PDE about the particular mobile station, for which alert-based services, if any, at least one corresponding alert condition is met, and for triggering the firing of an alert associated with each alert-based service for which at least one corresponding alert condition has been met by the particular mobile station.

17. A computer readable storage medium as defined in claim 16, wherein said scheduling module is operative to insert and remove data elements in a storage medium defining a sequence of slots such that the data elements are arranged according to the order for servicing the location requests computed by said scheduling module.

18. A computer readable storage medium as defined in claim 17, wherein each data element is associated to a location request.

19. A computer readable storage medium as defined in claim 18, wherein said scheduling module is operative to re-compute the order of the data elements in the storage medium when new expiry times data associated with a new location request is received by said scheduling module.

20. A computer readable storage medium as defined in claim 19, wherein each slot in the sequence of slots corresponds to a point in time at which the PDE is expected to service the location request of a data element stored in the slot.

21. A computer readable storage medium as defined in claim 20, wherein the re-computation includes for a new location request identifying a slot in the sequence of slots that corresponds to a point in time for servicing the new location request that is within the expiry time of the location request.

22. A computer readable storage medium as defined in claim 21, wherein the re-computation includes identifying a slot in the sequence of slots that corresponds to a latest point in time for servicing the new location request, without exceeding the expiry time of the new location request.

23. A computer readable storage medium as defined in claim 21, wherein if the slot that corresponds to the latest point in time for servicing the new location request is vacant, said scheduling module is operative for storing a data element associated to the new location request in the slot that corresponds to the latest point in time.

24. A computer readable storage medium as defined in claim 23, wherein if the slot that corresponds to the latest point in time for servicing the new location request is occupied by a data element associated with a prior location request, then said scheduling module is operative for:
 a) displacing the data element associated with the prior location request to a slot corresponding to an earlier point in time for servicing the prior location request to vacate the slot containing the data element associated with the prior location request; and
 b) inserting the data element associated with the new location request in the vacated slot.

25. A computer readable storage medium as defined in claim 17, wherein the data elements are arranged according to a search tree.

26. A computer readable storage medium as defined in claim 25, wherein each data element is associated to a location request and each data element is represented by a node in said search tree.

27. A computer readable storage medium as defined in claim 26, wherein the nodes of said search tree are ordered according to the expiry times of the respective location requests.

28. A method for scheduling servicing of location requests by a position determining entity (PDE) and for triggering the firing of alerts in a communications network adapted to provide alert based services for a plurality of mobile stations, comprising:
 a) receiving expiry times data indicative of a plurality of expiry times relating to respective location requests, the expiry times comprising at least one expected earliest future time at which at least one alert condition is capable of being met by a particular mobile station;
 b) processing the expiry times data for determining an order for servicing the location requests by the position determination equipment at least in part based on the expiry times of the location requests and a requirement to schedule a request to obtain updated location data about the particular mobile station in advance of the at least one expected earliest future time;
 c) interfacing with the PDE for allowing the PDE to service the location requests according to the determining of the order for servicing the location requests;
 d) determining, on the basis of updated location data from the PDE about the particular mobile station, for which alert-based services, if any, at least one corresponding alert condition is met; and
 e) triggering the firing of an alert associated with each alert-based service for which at least one corresponding alert condition has been met by the particular mobile station.

29. An apparatus for scheduling servicing of location requests by a position determining entity (PDE) and for providing triggers for firing alerts in a communications network adapted to provide alert based services for a plurality of mobile stations, the apparatus comprising:
 a) an input for receiving from an entity data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station;
 b) a scheduler for determining when location requests are to be serviced, the determining being such that the servicing of at least some delayed-type location requests is postponed artificially;
 c) an output for interfacing with the PDE allowing the PDE to service the location requests according to the determining of when location requests are to be serviced; and
 d) at least one engine for determining, on the basis of updated location data from the PDE about the particular mobile station, for which alert-based services, if any, at least one corresponding alert condition is met, and for generating a trigger to fire an alert associated with each alert-based service for which at least one corresponding alert condition has been met by the particular mobile station.

30. An apparatus as defined in claim 29, wherein the determining is such that the servicing of the delayed-type location requests is postponed artificially without exceeding the expiry time data of the respective delayed-type location requests.

31. An apparatus as defined in claim 29, wherein said scheduler includes a storage medium defining a sequence of slots for holding data elements according to the determining of when location requests are to be serviced.

32. An apparatus as defined in claim 31, wherein each data element in said storage medium is associated to a location request.

33. An apparatus as defined in claim 32, wherein said scheduler is operative to re-compute the order of the data elements in said storage medium when new expiry times data associated with a new location request is received at said input.

34. An apparatus as defined in claim 30, wherein the data elements are arranged according to a search tree.

35. An apparatus as defined in claim 34, wherein each data element is associated to a location request and each data element is represented by a node in said search tree.

36. An apparatus as defined in claim 35, wherein the nodes of said search tree are ordered according to the expiry times of the respective location requests.

37. A method for scheduling servicing of location requests by a position determining entity (PDE) and for providing triggers for firing alerts in a communications network adapted to provide alert based services for a plurality of mobile stations, the method comprising:
 a) receiving from an entity data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station;
 b) determining when location requests are to be serviced, the determining being such that the servicing of at least some delayed-type location requests is postponed artificially;
 c) interfacing with the PDE allowing the PDE to service the location requests according to the determining when location requests are to be serviced; and d) determining, on the basis of updated location data from the PDE about the particular mobile station, for which alert-based services, if any, at least one corresponding alert condition is met; and e) providing a trigger to an alert-based application to fire an alert associated with each alert-based service for which at least one corresponding alert condition has been met by the particular mobile station.

38. A method as defined in claim 37, wherein the determining is such that the servicing of the delayed-type location requests is postponed artificially without exceeding the expiry time data of the respective delayed-type location requests.

39. A computer readable storage medium including a program element for execution by a processor to implement an apparatus for scheduling servicing of location requests by a position determining entity (PDE) and for triggering the firing of alerts in a communications network adapted to provide alert based services for a plurality of mobile stations, comprising:

a) a scheduling module for accepting from an entity as input data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station, said scheduling module being operative for determining when location requests are to be serviced, the determining being such that the servicing of at least some delayed-type location requests is postponed artificially; and b) an output module for interfacing with the PDE allowing the PDE to service the location requests according to the determining of when location requests are to be serviced; and c) at least one engine for determining, on the basis of updated location data from the PDE about the particular mobile station, for which alert-based services, if any, at least one corresponding alert condition is met, and for generating a trigger to fire an alert associated with each alert-based service for which at least one corresponding alert condition has been met by the particular mobile station.

40. A computer readable storage medium as defined in claim 39, wherein the determining is such that the servicing of the delayed-type location requests is postponed artificially without exceeding the expiry time data of the respective delayed-type location requests.

41. An apparatus for scheduling servicing of location requests by a position determining entity (PDE) and for providing triggers for firing alerts in a communications network adapted to provide alert based services for a plurality of mobile stations, the apparatus comprising:

a) an input for receiving from an entity a plurality of data elements comprising location request data elements associated with delayed-type location requests and including expiry time data, the plurality of data elements indicative of a requirement to schedule a request to obtain updated location data about a particular mobile station in advance of an expected earliest future time at which at least one alert condition is capable of being met by a particular mobile station;

b) a scheduler for:
i) identifying among the delayed-type location requests, two or more delayed-type location requests that can be serviced by a common location query to the PDE; and
ii) determining at least in part on the basis of the respective expiry times of the delayed-type location requests identified at (i) when to issue the common location query to the PDE;

c) an output for issuing the common location query; and d) at least one engine for determining, on the basis of updated location data from the PDE about the particular mobile station, for which alert-based services, if any, at least one corresponding alert condition is met, and for generating a trigger to fire an alert associated with each alert-based service for which at least one corresponding alert condition has been met by the particular mobile station.

42. A method for scheduling servicing of location requests by a position determining entity (PDE) and for providing triggers for firing alerts in a communications network adapted to provide alert based services for a plurality of mobile stations, the method comprising:

i) receiving from an entity a plurality of data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station;

ii) identifying among the delayed-type location requests, two or more delayed-type location requests that can be serviced by a common location query to the PDE;

iii) determining at least in part on the basis of the respective expiry times of the delayed-type location requests identified at (ii) when to issue the common location query to the PDE; and iv) issuing the common location query;

v) determining, on the basis of updated location data from the PDE about the particular mobile station, for which alert-based services, if any, at least one corresponding alert condition is met; and vi) triggering the firing of an alert associated with each alert-based service for which at least one corresponding alert condition has been met by the particular mobile station.

43. A computer readable storage medium including a program element for execution by a processor to implement an apparatus for scheduling servicing of location requests by a position determining entity (PDE) and for providing triggers for firing alerts in a communications network adapted to provide alert based services for a plurality of mobile stations, comprising:

a) a scheduling module for accepting from an entity a plurality of data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station, said scheduling module being operative for:

i) identifying among the delayed-type location requests, two or more delayed-type location requests that can be serviced by a common location query to the PDE; and ii) determining at least in part on the basis of the respective expiry times of the delayed-type location requests identified at (i) when to issue the common location query to the PDE;

b) an output module for issuing the common location query; and c) at least one engine for determining, on the basis of updated location data from the PDE about the particular mobile station, for which alert-based services, if any, at least one corresponding alert condition is met, and for generating a trigger to fire an alert associated with each alert-based service for which at least one corresponding alert condition has been met by the particular mobile station.

44. An apparatus for scheduling servicing of location requests by a position determining entity (PDE) and for providing triggers for firing alerts in a communications network adapted to provide alert based services for a plurality of mobile stations, the apparatus comprising:

a) input means for receiving expiry times data indicative of a plurality of expiry times relating to respective location requests, the expiry times comprising at least one expected earliest future time at which at least one alert condition is capable of being met by a particular mobile station;

b) scheduler means for processing the expiry times data for determining an order for servicing the location requests by the PDE at least in part based on the expiry times of the location requests and a requirement to schedule a request to obtain updated location data about the particular mobile station in advance of the at least one expected earliest future time;

c) output means for interfacing with the PDE allowing the PDE to service the location requests according to the order determined by said scheduler; and d) triggering means for determining, on the basis of updated location data from the PDE about the particular mobile station, for which alert-based services, if any, at least one corresponding alert condition is met, and for providing a trigger to an alert-based application to fire an alert associated with each alert-based service for which at least one corresponding alert condition has been met by the particular mobile station.

45. An apparatus for scheduling servicing of location requests by a position determining entity (PDE) and for providing triggers for firing alerts in a communications network adapted to provide alert based services for a plurality of mobile stations, the apparatus comprising:

a) input means for receiving from an entity data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station;

b) scheduling means for determining when location requests are to be serviced, the determining being such that the servicing of at least some delayed-type location requests is postponed artificially;

c) output means for interfacing with the PDE allowing the PDE to service the location requests according to the determining; and d) triggering means for determining, on the basis of updated location data from the PDE about the particular mobile station, for which alert-based services, if any, at least one corresponding alert condition is met, and for triggering the firing of an alert associated with each alert-based service for which at least one corresponding alert condition has been met by the particular mobile station.

46. An apparatus for scheduling servicing of location requests by a position determining entity (PDE) and for providing triggers for firing alerts in a communications network adapted to provide alert based services for a plurality of mobile stations, comprising:

a) input means for receiving from an entity a plurality of data elements comprising location request data elements associated with delayed-type location requests and including expiry time data, the data elements indicative of a requirement to schedule a request to obtain updated location data about a particular mobile station in advance of an expected earliest future time at which at least one alert condition is capable of being met by a particular mobile station;

b) scheduling means for:
i) identifying among the delayed-type location requests, two or more delayed-type location requests that can be serviced by a common location query to the PDE; and
ii) determining at least in part on the basis of the respective expiry times of the delayed-type location requests identified at (i) when to issue the common location query to the PDE; and c) output means for issuing the common location query d) triggering means for determining, on the basis of updated location data from the PDE about the particular mobile station, for which alert-based services, if any, at least one corresponding alert condition is met, and for generating a trigger to fire an alert associated with each alert-based service for which at least one corresponding alert condition has been met by the particular mobile station.

47. A data processing device for use in a communications network adapted to provide alert-based services for which corresponding alert conditions to be met by mobile stations are defined, comprising:

an input capable of receiving updated location data about the mobile stations and capable of receiving an indication of at least one alert condition of an alert-based service for a particular mobile station; and a processing unit connected to the input, said processing unit being capable of:
determining an expected earliest future time at which at least one alert condition is capable of being met by a particular mobile station;
scheduling a request to obtain updated location data about the particular mobile station in advance of the expected earliest future time;
determining, on the basis of the updated location data about the particular mobile station, for which alert-based services, if any, at least one corresponding alert condition is met by the particular mobile station; and
providing a trigger to an application program to fire an alert associated with at least one alert-based service for which at least one corresponding alert condition has been met by the particular mobile station;

a memory for storing data for access by the application program, comprising:

a secondary memory for holding a plurality of data structures, the data structures being associated with respective non-overlapping time intervals, each of the data structures containing information relevant to a respective category of alert conditions that requires a current time to be included in the time interval associated with that data structure; and a primary memory for storing the one data structure associated with the time interval that includes the current time.

48. A method of creating a trigger for an application program being executed on a data processing device used in a communications network adapted to provide alert-based services for which corresponding alert conditions to be met by mobile stations are defined, each alert condition corresponding to an alert region, the method comprising:

defining a subdivision of the network into nodes;

computing, for each node, the nearest alert region;

merging together into a single cell for each alert region, those nodes having that alert region as the nearest alert region;

maintaining a data structure that is indicative of the locations covered by each cell and the alert condition associated with that cell;

receiving location data about a particular mobile station;

determining an expected earliest future time at which the alert condition is capable of being met by the particular mobile station;

scheduling a request to obtain updated location data about the particular mobile station in advance of the expected earliest future time;

receiving updated location data about the particular mobile station, wherein at least a portion of the updated location data is received in advance of the expected earliest future time;

determining, based on the updated location data about the particular mobile station, for which alert-based services at least one corresponding alert condition is met by the particular mobile station; and providing a trigger to the application program to fire an alert associated with each alert-based service for which at least one corresponding alert condition has been met by the particular mobile station.

49. A method as defined in claim 48, each alert condition further corresponding to an alert time, the method further comprising maintaining separate data structures for at least two sets of alert conditions corresponding to respective disjoint time blocks, each set of alert conditions including those alert conditions corresponding to alert times contained within the respective time block.

50. A method of delivering an alert-based communications service relevant to a mobile station in a communications network, wherein the alert-based communications service is associated with an alert condition to be satisfied by the mobile station, comprising:

obtaining location data about the mobile station for a first time instant;

determining an expected earliest future time at which the alert condition is capable of being met by the mobile station;

scheduling a request to obtain updated location data about the mobile station in advance of the expected earliest future time;

receiving updated location data about the mobile station, wherein at least a portion of the updated location data is received in advance of the expected earliest future time;

predicting location data about the mobile station for a second time instant after the first time instant based on the updated location data about the mobile station; and if the mobile station is predicted to be within the alert region at the second time instant, triggering the firing of an alert at or after the second time instant.

51. A method as defined in claim 50, wherein predicting location data is based on recent information regarding the mobile station.

52. A method as defined in claim 50, wherein predicting location data is based on historical information regarding the mobile station.

53. A method as defined in claim 50, wherein predicting location data is based on current information regarding other mobile stations in the network.

* * * * *